US00RE46497E

(19) United States
(12) Reissued Patent
Baek et al.

(10) Patent Number: US RE46,497 E
(45) Date of Reissued Patent: Aug. 1, 2017

(54) LIQUID CRYSTAL DISPLAY APPARATUS HAVING DATA LINES WITH CURVED PORTIONS AND METHOD

(71) Applicant: SAMSUNG DISPLAY CO., LTD., Yongin, Gyeonggi-Do (KR)

(72) Inventors: Seung-Soo Baek, Seoul (KR); Dong-Gyu Kim, Yongin-si (KR)

(73) Assignee: SAMSUNG DISPLAY CO., LTD., Gyeonggi-Do (KR)

(21) Appl. No.: 14/509,699

(22) Filed: Oct. 8, 2014

Related U.S. Patent Documents

Reissue of:
(64) Patent No.: 7,796,223
Issued: Sep. 14, 2010
Appl. No.: 11/370,561
Filed: Mar. 6, 2006

U.S. Applications:
(62) Division of application No. 13/288,191, filed on Nov. 3, 2011, now abandoned, which is an application for the reissue of Pat. No. 7,796,223.

(30) Foreign Application Priority Data

Mar. 9, 2005 (KR) ..... 10-2005-0019611
Mar. 31, 2005 (KR) ..... 10-2005-0027108

(51) Int. Cl.
*G02F 1/136* (2006.01)
*G02F 1/1343* (2006.01)
*G02F 1/1368* (2006.01)

(52) U.S. Cl.
CPC ..... *G02F 1/1368* (2013.01)

(58) Field of Classification Search
CPC ..... G02F 1/1368; G92F 1/133707
See application file for complete search history.

(56) References Cited

U.S. PATENT DOCUMENTS 5,062,690 A 11/1991 Whetten
5,414,283 A * 5/1995 den Boer et al. ..... 257/59
5,904,508 A * 5/1999 Codama ..... H01L 27/1214 257/E21.413

(Continued)

FOREIGN PATENT DOCUMENTS

JP 02244125 A 9/1990
JP 2003315766 A 11/2003

(Continued)

*Primary Examiner* — Deandra Hughes
(74) *Attorney, Agent, or Firm* — Cantor Colburn LLP

(57) ABSTRACT

A liquid crystal display apparatus includes a plurality of data lines each having a plurality of straight line portions and a plurality of curved portions connected to a plurality of the straight line portions; a plurality of gate lines intersecting the data lines; thin film transistors connected to the data lines and the gate lines; and pixel electrodes connected to the thin film transistors. Accordingly, even in a case where driver inversion becomes column inversion, apparent inversion can become dot inversion. As a result, it is possible to eliminate transverse line flicker and to increase a charging rate of pixels. In addition, uniformity of the pixels can be maintained, so that the inversion driving schemes can be applied to a PVA mode. As a result, it is possible to obtain a wide viewing angle and to improve side or lateral visibility.

12 Claims, 29 Drawing Sheets

(56) References Cited

U.S. PATENT DOCUMENTS 6,248,675 B1 * 6/2001 Xiang ..... H01L 21/28061 257/E21.133
6,255,130 B1 * 7/2001 Kim ..... 438/30
6,906,760 B2 * 6/2005 Yoo ..... G02F 1/136286 257/59
6,930,743 B2 * 8/2005 Park ..... G02F 1/13458 349/149
7,098,987 B1 * 8/2006 Jen ..... G02F 1/1309 349/152
7,321,414 B2 * 1/2008 Sekiguchi ..... G02F 1/1362 349/142
7,508,479 B2 * 3/2009 Kim ..... G09G 3/3688 349/149
8,077,280 B2 * 12/2011 Chang ..... G02F 1/134363 257/59
2002/0044231 A1 * 4/2002 Yeo ..... G02F 1/136227 349/43
2002/0101547 A1 * 8/2002 Lee ..... G02F 1/136204 349/40
2003/0090601 A1 * 5/2003 Kim et al. ..... 349/43
2003/0218178 A1 11/2003 Kim
2004/0080679 A1 * 4/2004 Song et al. ..... 349/43
2004/0257519 A1 12/2004 Jun
2005/0030460 A1 * 2/2005 Kim et al. ..... 349/139
2005/0030465 A1 * 2/2005 Park ..... G02F 1/13458 349/149
2005/0036091 A1 * 2/2005 Song ..... 349/129
2005/0146645 A1 * 7/2005 Lai ..... G02F 1/1368 349/38
2005/0248708 A1 * 11/2005 Park ..... G02F 1/1345 349/149
2005/0258420 A1 * 11/2005 Kido ..... H01L 21/0274 257/48
2006/0033852 A1 * 2/2006 Kim ..... G09G 3/3648 349/38
2006/0050219 A1 * 3/2006 Lee ..... G02F 1/136259 349/141
2006/0114399 A1 * 6/2006 Kim ..... G02F 1/1362 349/139
2006/0146219 A1 * 7/2006 Jeong ..... G02F 1/134363 349/43
2006/0169984 A1 * 8/2006 Moon ..... G02F 1/136213 257/72

FOREIGN PATENT DOCUMENTS

KR 1020030049259 A 6/2003
KR 1020040036260 A 4/2004
KR 1020040105934 A 12/2004

* cited by examiner

LIQUID CRYSTAL DISPLAY APPARATUS HAVING DATA LINES WITH CURVED PORTIONS AND METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This application is a divisional application of application Ser. No. 13/288,191. More than one reissue application has been filed for the reissue of U.S. Pat. No. 7,796,223, which issued on Sep. 14, 2010. The more than one reissue application is the present application Ser. No. 13/288,191, filed on Nov. 3, 2011 and application Ser. No. 13/288,191, filed on Nov. 3, 2011.* This application claims priority to Korean Patent Applications No. 2005-0019611, filed on Mar. 9, 2005 and No. 2005-0027108, filed on Mar. 31, 2005 in the Korean Intellectual Property Office, and all the benefits accruing therefrom under 35 U.S.C. §119, and the contents of which in their entirety are herein incorporated by reference.

BACKGROUND OF THE INVENTION (a) Field of the Invention

The present invention relates to a liquid crystal display apparatus.

(b) Description of the Related Art

A liquid crystal display ("LCD") apparatus is one of the most widely used flat panel display apparatuses. The LCD apparatus includes two panels (e.g., a lower panel and an upper panel) each having electric field generating electrodes, such as pixel electrodes and a common electrode, and a liquid crystal ("LC") layer interposed therebetween. The LCD apparatus displays an image by applying a voltage to the electric field generating electrodes to generate an electric field in the LC layer which determines alignment of LC molecules in the LC layer to control polarization of incident light.

Among such LCD apparatuses, a vertical alignmnent (VA) mode LCD, which aligns LC molecules such that the long axes of the LC molecules are perpendicular to the panels in the absence of electric field, is spotlighted because of the high contrast ratio and wide reference viewing angle obtained with the VA mode LCD. Here, the reference viewing angle means a viewing angle having a contrast ratio of 1:10 or an effective angle in inversion of brightness between grayscales.

The wide viewing angle of the VA mode LCD can be realized by protrusions on and/or cut portions in the field-generating electrodes. Since the direction in which the liquid crystal molecules are tilted can be determined by the use of the cut portions and the protrusions, the reference viewing angle can be widened by variously arranging the cut portions and the protrusions to distribute the tilt direction of the liquid crystal molecules in various directions.

However, the VA mode LCD has poor lateral visibility as compared with front visibility. For example, in a case of an LCD apparatus with a patterned vertical alignment ("PVA") mode having the cut portions, an image becomes brighter at the sides thereof, and in some cases the difference in brightness between high grayscales may disappear making the profile of the image vague.

To improve the lateral visibility, a conventional method includes dividing a pixel into two sub-pixels capacitively coupled to each other. One of the two sub-pixels is directly supplied with a voltage, while the other is subjected to a voltage drop by the capacitive coupling such that the two sub-pixels have different voltages, and therefore, cause different transmittances of light incident on the LC layer.

However, the conventional method may not control the transmittances of the two sub-pixels. In a high resolution LCD apparatus, one horizontal period (1 H) is shortened in the conventional method, so that a charging margin of pixels is reduced. In addition, when a frame frequency increases, for example when the frame frequency is 120 Hz, the one horizontal period (1 H) is extremely short, such that the image signal cannot be displayed.

In addition, if the two divided sub-pixels have openings having different shapes, optical characteristics at front and side surfaces are different from each other and thus deterioration in image quality results.

BRIEF SUMMARY OF THE INVENTION

The present invention provides a liquid crystal display apparatus capable of improving side or lateral visibility, increasing a charging rate of pixels even at high resolution and high frame frequency and preventing deterioration in image quality.

According to an exemplary embodiment of the present invention, a liquid crystal display apparatus comprises: a plurality of data lines having a plurality of straight line portions and a plurality of curved portions connected to a plurality of straight line portions, a plurality of gate lines intersecting the data lines, thin film transistors connected to the data lines and the gate lines, and pixel electrodes connected to the thin film transistors, wherein the straight line portions and the curved portions for each data line are disposed substantially in the same line.

In the above exemplary embodiment of the present invention, channels of the thin film transistors may be disposed in extension lines of the straight line portions of the data lines.

In addition, the curved portions may constitute source electrodes of the thin film transistors. The liquid crystal display apparatus may further comprise drain electrodes connected to the pixel electrodes, wherein the curved portions surround ends of the drain electrodes.

The drain electrodes may be located at the same positions in the pixels, or may be symmetrically disposed.

The curved portions may be formed to have a U-shape, and the curved portions may have inlets which open in opposite directions every alternate pixel row.

The liquid crystal display apparatus may further comprise shielding electrodes which cover the straight line portions of the data lines and at least partially overlap the curved portions of the data lines.

In addition, the thin film transistors of different pixel rows may be connected to the data lines of different sides, and may be connected to the data lines of different sides every alternate pixel row.

Polarities of the data voltages of the adjacent data lines may be opposite to each other, or polarities of the data voltages of the data lines may be equal to each other.

Each of the pixel electrodes may have at least one cut portion, and each of the pixel electrodes may include a first sub-pixel electrode connected to the drain electrode and a second sub-pixel electrode capacitively-coupled with the first sub-pixel electrode. A voltage charged in the first sub-pixel electrode is larger than a voltage charged in the second sub-pixel electrode.

According to another exemplary embodiment of the present invention, a liquid crystal display apparatus comprises: a plurality of data lines each having a plurality of first straight line portions, a plurality of second straight line portions alternately disposed with the first straight line portions, and first and second curved portions alternately connected between the first and second straight line portions; a plurality of pairs of first and second gate lines intersecting the data lines; a plurality of pairs of first and second thin film transistors connected to the data lines and the first and second gate lines, respectively; and a plurality of pixel electrodes connected to the first and second thin film transistors.

In the above exemplary embodiment of the present invention, magnitudes of first and second data voltages applied to the first and second sub-pixel electrodes, respectively, may be different from each other, and may be obtained from single image information.

The first and second straight line portions and the first and second curved portions for each data line may be disposed substantially in the same line, and channels of the first and second thin film transistors may be disposed in extension lines of the first and second straight line portions of the data lines.

In addition, the liquid crystal display apparatus may further comprise first and second drain electrodes connected to the first and second sub-pixel electrodes, respectively, wherein the first and second curved portions surround ends of the first and second drain electrodes, respectively.

In addition, the first and second drain electrodes may be located substantially at the same positions relative to each pixel, or may be symmetrically disposed in a pixel array. The first and second thin film transistors may be connected to the data lines of different sides every alternate pixel row.

According to still another exemplary embodiment of the present invention, a liquid crystal display apparatus comprises: a plurality of pixels arrayed in a matrix and having pixel electrodes; a plurality of gate lines connected to the pixels and having a plurality of gate electrodes; a plurality of data lines intersecting the gate lines and having a plurality of source electrodes; and a plurality of drain electrodes facing the respective source electrodes and connected to the respective pixel electrodes, wherein switching devices constructed with the gate, source and drain electrodes are disposed at different positions, and wherein openings of the pixels have substantially the same shape.

In the above exemplary embodiment of the present invention, the gate lines may include dummy gate electrodes having substantially the same shape as the gate electrodes.

In addition, the liquid crystal display apparatus may further include dummy drain electrodes which are located at the same positions in each pixel as the drain electrodes or symmetrically disposed in a pixel array. Two pixels may be disposed between the adjacent two data lines, the switching devices and the data lines may be disposed substantially in the same line, and the adjacent source electrodes may be oriented in different directions with respect to the data lines.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF THE INVENTION

Figure 1:
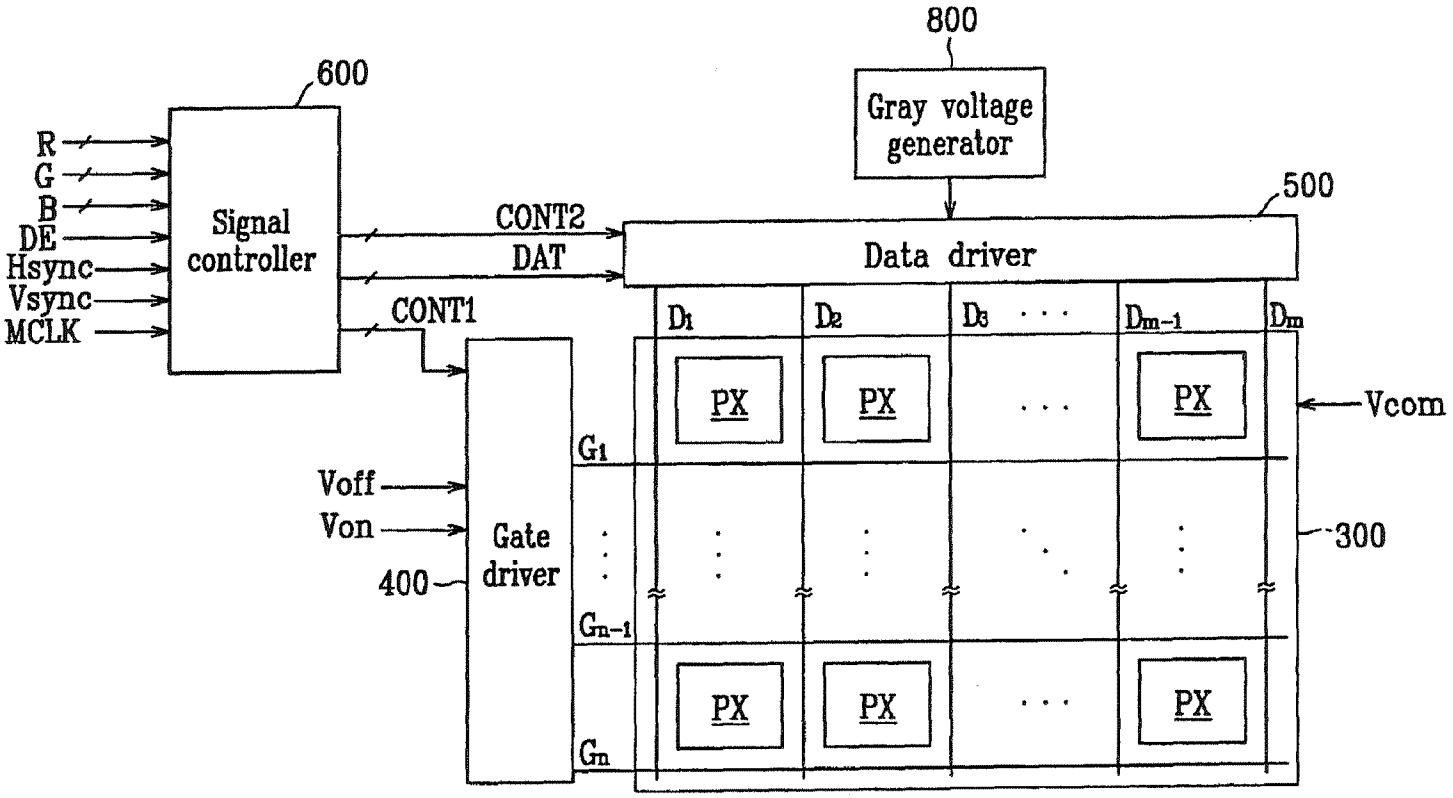
FIG. 1 is a block diagram showing an exemplary embodiment of a liquid crystal display apparatus according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Now, an exemplary embodiment of a liquid crystal display apparatus according to the present invention will be described with reference to accompanying drawings.

Figure 2:
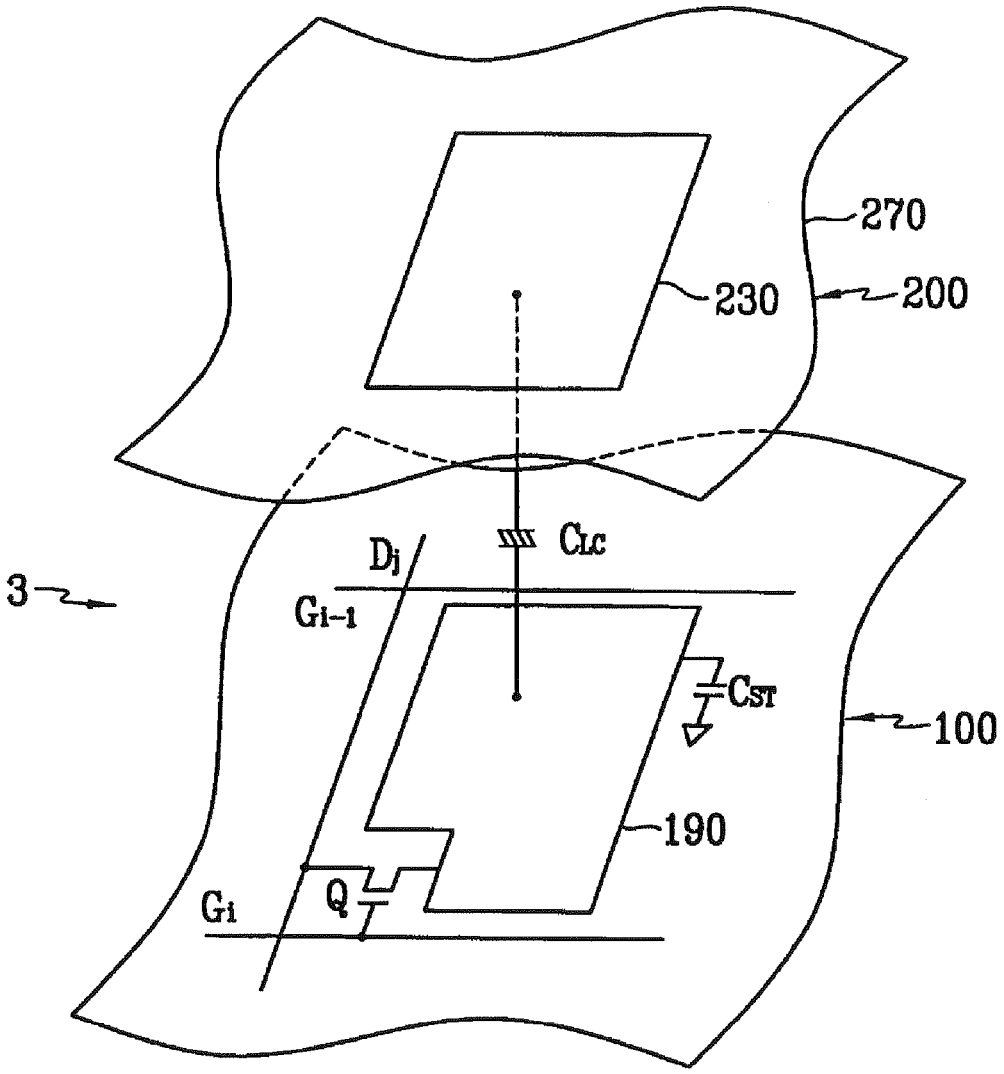
FIG. 2 is an equivalent schematic circuit diagram showing an exemplary embodiment of a pixel of the liquid crystal display apparatus according to the present invention.
Figure 3:
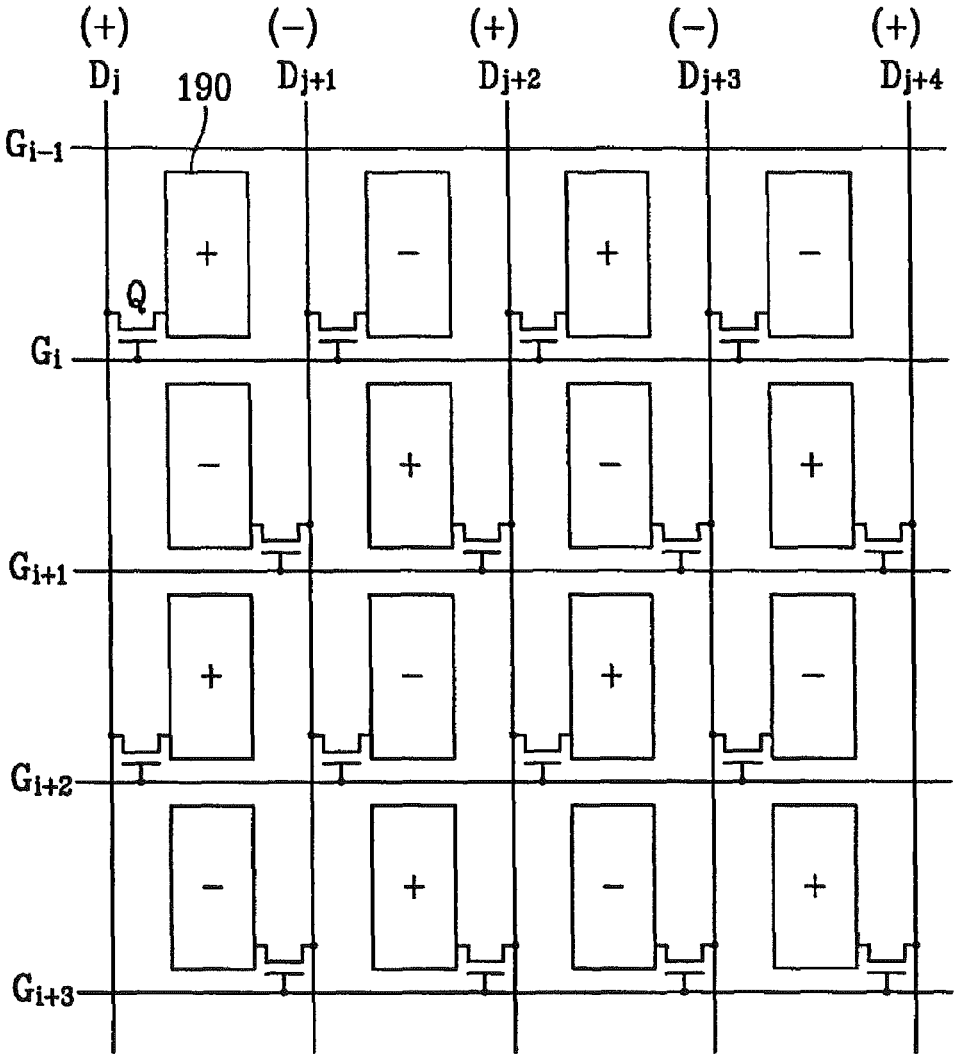
FIG. 3 is a schematic plan view showing an exemplary embodiment of a switching device array and polarity of pixels in the liquid crystal display apparatus according to the present invention.

FIG. 1 is a block diagram showing an exemplary embodiment of a liquid crystal display apparatus according to the present invention. FIG. 2 is an equivalent circuit schematic diagram showing an exemplary embodiment of a pixel of an liquid crystal display apparatus according to the present invention. FIG. 3 is a schematic plan view showing an exemplary embodiment of a switching device array and polarity of pixels in a liquid crystal display apparatus according to the present invention.

As shown in FIG. 1, the exemplary embodiment of the liquid crystal display apparatus according to the present invention includes a liquid crystal display panel assembly 300, a gate driver 400 and a data driver 500 connected to the liquid crystal display panel assembly 300, a grayscale voltage generator 800 connected to the data driver 500, and a signal controller 600 for controlling the components.

As seen in the equivalent circuit schematic diagram, the liquid crystal display panel assembly 300 includes a plurality of pixels PX, which are connected to a plurality of display signal lines $G_1$ to $G_n$ and $D_1$ to $D_m$ and arrayed substantially in a matrix.

The display signal lines $G_1$ to $G_n$ and $D_1$ to $D_m$ include a plurality of gate lines $G_1$ to $G_n$ for transmitting gate signals (sometimes referred to as scan signals) and a plurality of data lines $D_1$ to $D_m$ for transmitting data signals. The gate lines $G_1$ to $G_n$ extend parallel to each other substantially in a row direction, and the data lines $D_1$ to $D_m$ extend parallel to each other substantially in a column direction.

Each pixel PX includes a switching device Q connected to the display signal lines $G_1$ to $G_n$ and $D_1$ to $D_m$, a liquid crystal capacitor $C_{LC}$ connected to the switching device Q and a storage capacitor $C_{ST}$. The storage capacitor $C_{ST}$ may be omitted, as needed.

The switching devices Q such as thin film transistors are disposed on a lower panel 100 and are three-port devices. Control and input ports of the switching device Q are connected to the gate lines $G_1$-$G_n$ and the data lines $D_1$ to $D_m$, respectively, and an output port thereof is connected to the liquid crystal capacitor $C_{LC}$ and the storage capacitor $C_{ST}$.

As best seen with reference to FIG. 2, two ports of the liquid crystal capacitor $C_{LC}$ are a pixel electrode 190 of the lower display panel 100 and a common electrode 270 of an upper display panel 200. A liquid crystal layer 3 interposed between the two electrodes 190 and 270 serves as a dielectric member. The pixel electrode 190 is connected to the switching device Q, and the common electrode 270 is disposed in front of the upper display panel 200 to receive a common voltage $V_{com}$. Unlike in FIG. 2, the common electrode 270 may be disposed at the lower display panel 100, and in this case, at least one of the two electrodes 190 and 270 may be formed in a shape of a line or bar.

The storage capacitor $C_{ST}$ having an auxiliary function for the liquid crystal capacitor $C_{LC}$ is constructed by overlapping the pixel electrode 190 and a separate signal line (not shown) provided to the lower panel 100 with an insulating member interposed therebetween. A predetermined voltage, such as a common voltage $V_{com}$, is applied to the separate signal line. However, alternatively, the storage capacitor $C_{ST}$ may be constructed by overlapping the pixel electrode 190 and a front gate line disposed just above with an insulating member interposed therebetween.

On the other hand, in order to implement color display, each of the pixels uniquely displays one of primary colors (spatial division), or each of the pixels alternately displays the primary colors according to time (time division). A desired color can be obtained by a spatial or time combination of the primary colors. An example of the colors is three colors such as red, green, and blue, and may also be primary colors.

FIG. 2 show an example of the spatial division where each pixel has a color filter 230 representing one of the three colors in a region corresponding to the pixel electrode 190.

Unlike in FIG. 2, the color filter 230 may be provided above or below the pixel electrode 190 of the lower display panel 100.

As shown in FIG. 3, the positions of the switching devices of the pixels PX in the liquid crystal display apparatus according to the exemplary embodiment change every pixel row. Namely, in the adjacent rows of pixels, the switching devices Q are alternately connected to the data lines of the different sides. Among the four pixel rows of pixels shown in FIG. 3, the switching devices Q of the uppermost pixel row and the third pixel row are connected to the left data lines, and on the contrary, the switching devices Q of the second pixel row and the fourth pixel row are connected to the right data lines. In other words, the switching devices of one pixel row are connected to one gate line, and the switching devices of one pixel column are alternately connected to the adjacent data lines.

Returning to FIG. 1, the grayscale voltage generator 800 generates two pairs of grayscale voltages associated with transmittance of the pixels. One of the two pairs has a positive value with reference to the common voltage $V_{com}$, and the other has a negative value with reference to the common voltage $V_{com}$.

The gate driver 400 is connected to the gate lines $G_1$, to $G_n$ of the liquid crystal display panel assembly 300 to apply gate signals (formed in a combination of a gate-on voltage $V_{on}$ and a gate-off voltage $V_{off}$ that are externally supplied) to the gate lines $G_1$ to $G_n$.

The data driver 500 is connected to the data lines $D_1$ to $D_m$ of the liquid crystal display panel assembly 300 to select grayscale voltages from the grayscale voltage generator 800 and apply the selected grayscale voltages to the pixels as data signals.

The gate driver 400 or the data driver 500 may be directly mounted in a form of a plurality of driving IC chips on the liquid crystal display panel assembly 300. Alternatively, the gate driver 400 or the data driver 500 may be attached in a form of a tape carrier package ("TCP") on a flexible printed circuit ("FPC") film (not shown) in the liquid crystal display panel assembly 300. Further, the gate drivers 400 or the data drivers 500 may be directly mounted on the liquid crystal display panel assembly 300.

The signal controller 600 controls operations of the gate driver 400, the data driver 500, and the like.

Now, display operations of the liquid crystal display apparatus will be described in detail.

The signal controller 600 receives input image signals R, G, and B and input control signals for controlling display thereof from an external graphics controller (not shown). As an example of the input control signals, a vertical synchronization signal Vsync, a horizontal synchronization signal Hsync, a main clock signal MCLK and a data enable signal DE are received. The signal controller 600 processes the image signals R, G and B according to an operating condition of the liquid display panel assembly 300 based on the input control signals and the input image signals R, G and B to generate a gate control signal CONT1 and a data control signal CONT2. After that, the signal controller 600 transmits the generated gate control signal CONT1 to the gate driver 400 and the generated data control signal CONT2 and the processed image signal DAT to the data driver 500.

The gate control signal CONT1 includes a synchronization start signal STV for indicating scan start of the gate-on voltage $V_{on}$, at least one gate clock signal for controlling an output of the gate-on voltage $V_{on}$, and the like.

The data control signal CONT2 includes a horizontal synchronization start signal STH for indicating data transmission for one pixel row, a load signal LOAD for commanding to apply the associated data voltages to the data lines $D_1$ to $D_m$, a reverse signal RVS for inverting a polarity of the data voltage with respect to the common voltage $V_{com}$ (hereinafter, "polarity of the data voltage with respect to the common voltage $V_{com}$" is abbreviated to "data signal polarity"), and a data clock signal HCLK.

In response to the data control signal CONT2 from the signal controller 600, the data driver 500 receives the image data DAT for one pixel row and selects the grayscale voltage corresponding to each of the image data DAT from the grayscale voltage generator 800 to convert the image data DAT to the associated data voltages, and after that, applies the data voltages to the data lines $D_1$ to $D_m$.

In response to the gate control signal CONT1 from the signal controller 600, the gate driver 400 applies the gate-on voltage $V_{on}$ to the gate lines $G_1$ to $G_n$ to turn on the switching devices Q connected to the gate lines $G_1$ to $G_n$. As a result, the data voltages applied to the data lines $D_1$ to $D_m$ are applied to the associated pixels through the turned-on switching devices Q.

A difference between the data voltage applied to the pixel and the common voltage $V_{com}$ becomes a charge voltage of the liquid crystal capacitor $C_{LC}$, that is, a pixel voltage. Alignment of the liquid crystal molecules varies according to the intensity of the pixel voltage. Therefore, polarization of light passing through the liquid crystal layer 3 changes. The change in the polarization results in a change in transmittance of the light due to polarizers attached to the display panels 100 and 200.

When one horizontal period (or 1 H, that is, one period of the horizontal synchronization signal Hsync and the data enable signal DE) elapses, the data driver 500 and the gate driver 400 repeatedly perform the aforementioned operation for the next pixel row. In this manner, during one frame, the gate-on voltage $V_{on}$ is sequentially applied to all the gate lines $G_1$ to $G_n$, so that the data voltages are applied to all the pixels. When one frame ends, the next frame starts, and a state of the reverse signal RVS applied to the data driver 500 is controlled, so that the polarity of the data signal applied to each of the pixels is opposite to the polarity in the previous frame ("frame inversion").

Instead of the frame inversion, the data driver 500 inverts the polarities of the data voltages applied to the adjacent data lines $D_1$ to $D_m$ in one frame, so that the polarities of the pixel voltages of the pixels applied with the data voltages also change. On the other hand, as shown in FIG. 3, since the connection of the pixels with the data lines D1 to Dm changes every pixel row, the polarity inversion pattern (driver inversion pattern) of the pixel voltages in the data driver 500 is different from the polarity inversion pattern (apparent inversion pattern) of the pixel voltages displayed on a screen of the liquid crystal display panel assembly 300. Namely, the driver inversion becomes column inversion, but the apparent inversion becomes 1×1 dot inversion.

On the other hand, if the positions of the switching devices Q change every two pixel rows, the apparent inversion becomes 2×1 dot inversion. Various types of inversion may be implemented according to the positions of the switching devices Q.

In this way, if the apparent inversion becomes the dot inversion, the brightness difference (caused by kick-back voltages when the pixel voltage is a positive polarity and when the pixel voltage is a negative polarity) is dispersed, so that it is possible to eliminate transverse line flicker. In addition, if the driver inversion becomes the column inversion, the polarities of the data voltages applied to the data lines D1 to Dm during one frame are equal to each other, so that resolution or frame frequency increases. Accordingly, even in a case where one horizontal period is shortened, it is possible to increase a charging rate of pixels.

Now, an example of the liquid crystal display apparatus will be described in detail with reference to FIGS. 4 to 8.

Figure 4:
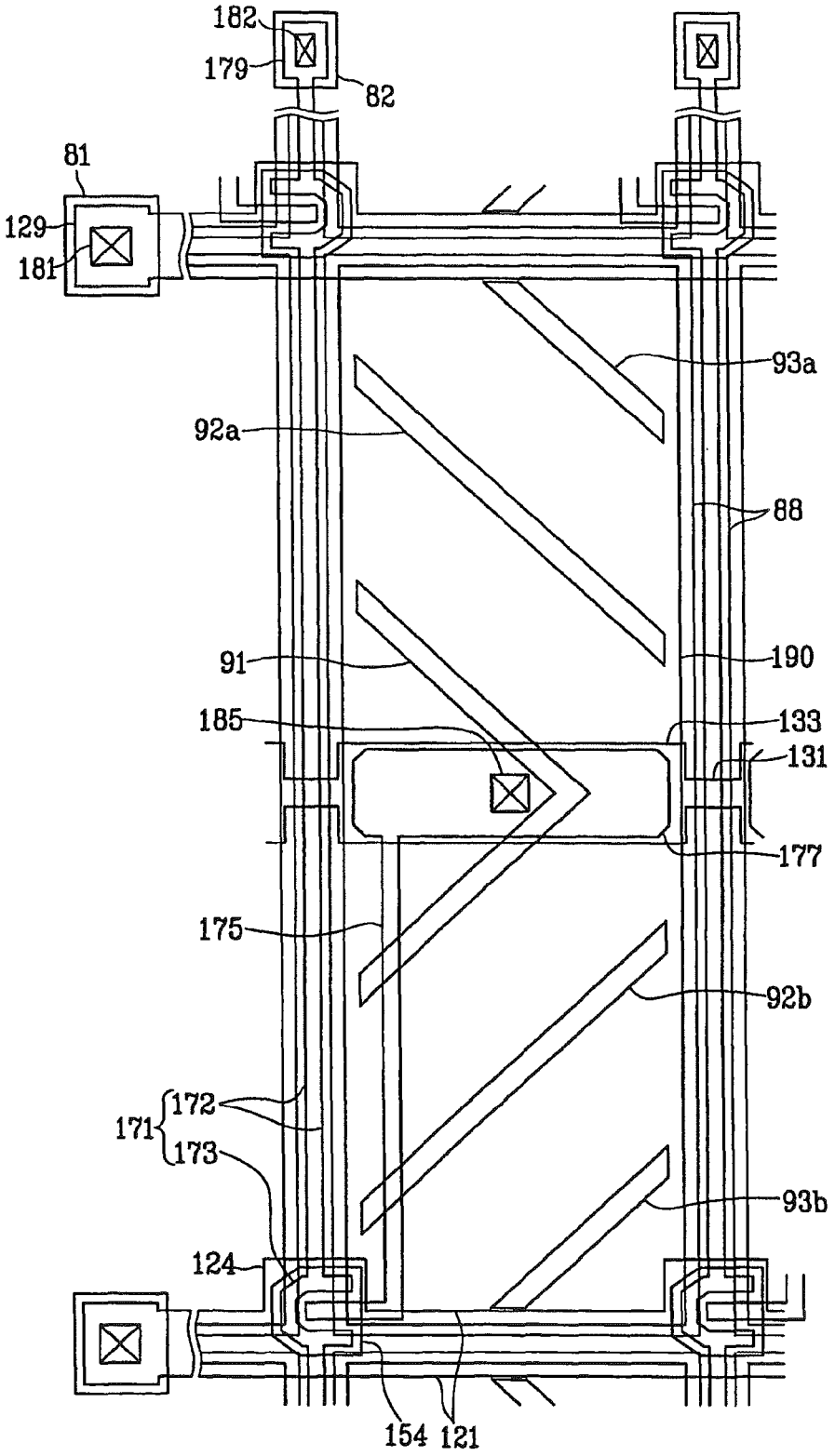
FIG. 4 is a plan view showing a layout of an exemplary embodiment of a thin film transistor panel for a liquid crystal display apparatus according to the present invention.
Figure 5:
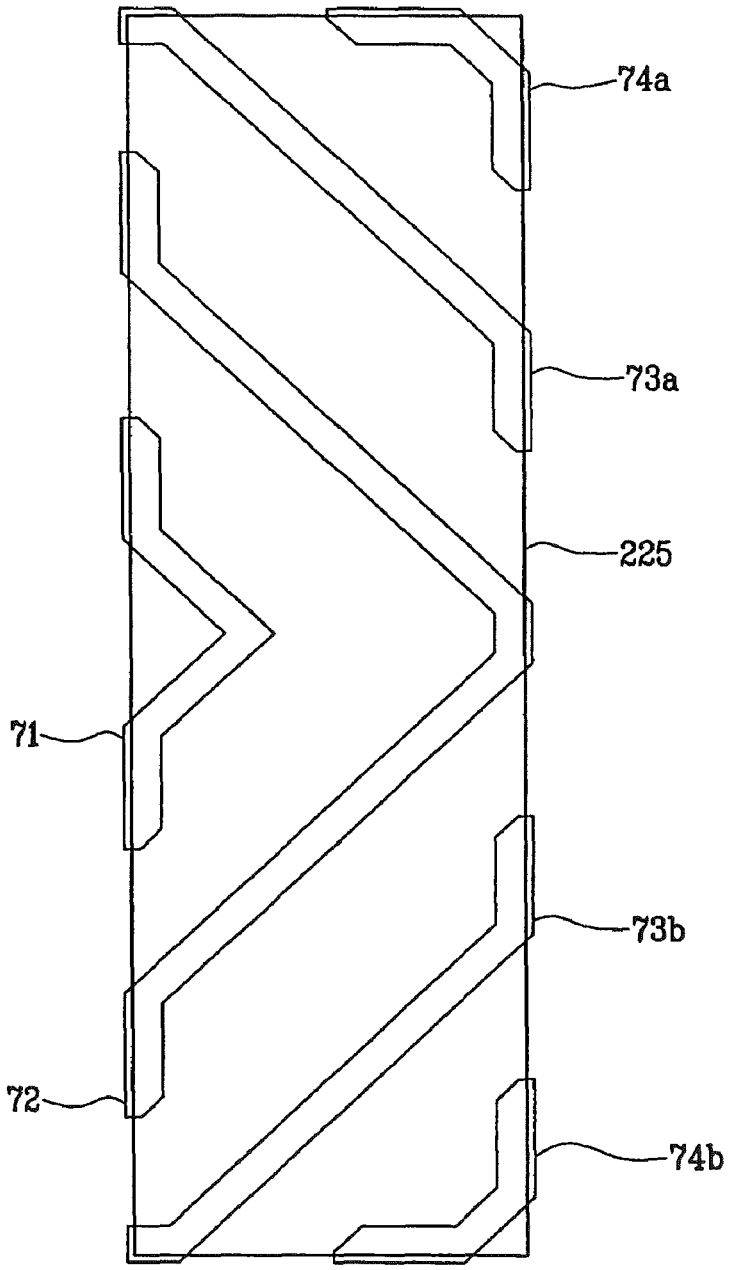
FIG. 5 is a plan view showing a layout of an exemplary embodiment of a common electrode panel for a liquid crystal display apparatus according to the present invention.
Figure 6:
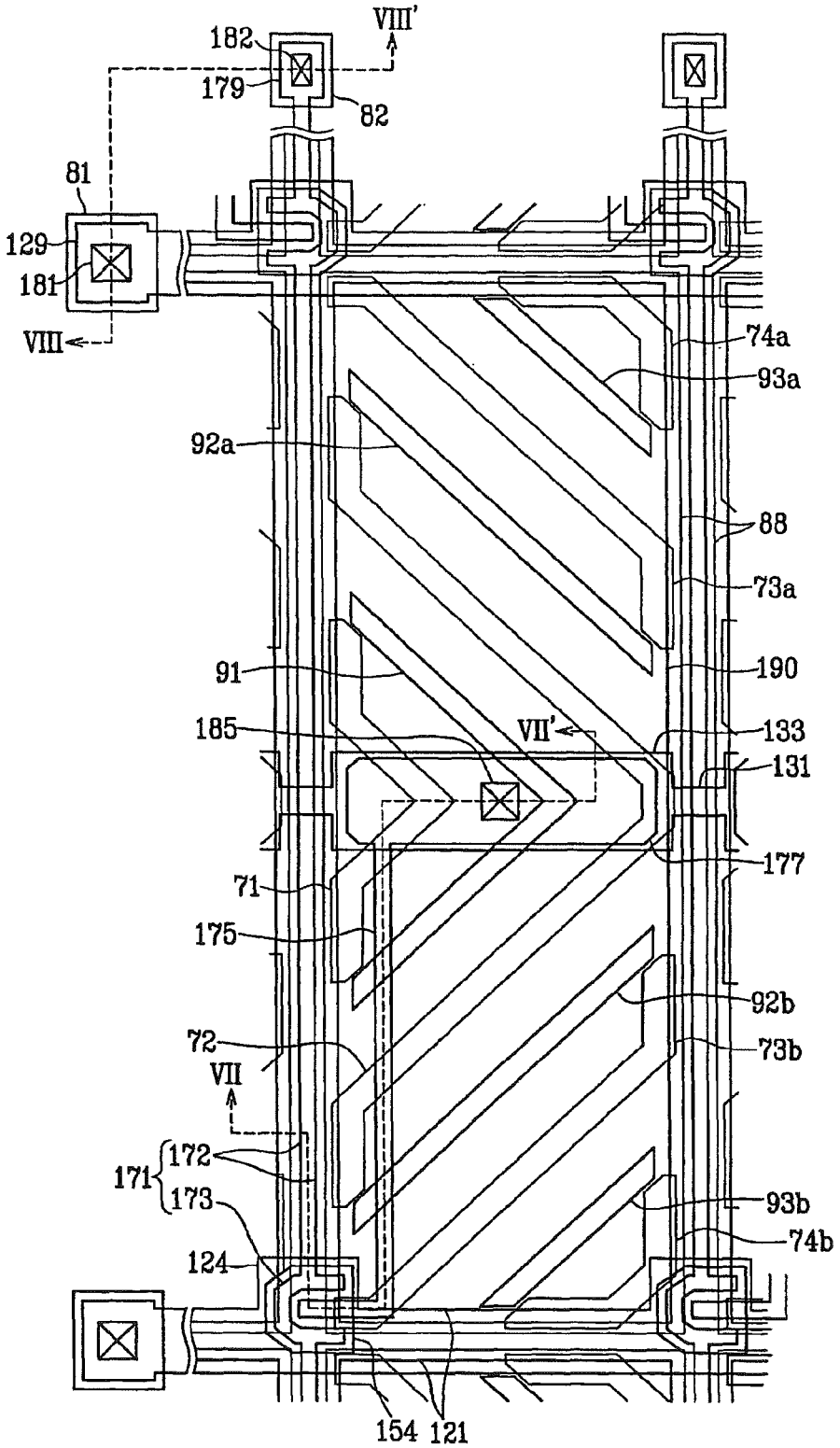
FIG. 6 is a plan view showing a layout of a liquid crystal display apparatus constructed with the thin film transistor panel of FIG. 4 and the common electrode panel of FIG. 5.
Figure 7:
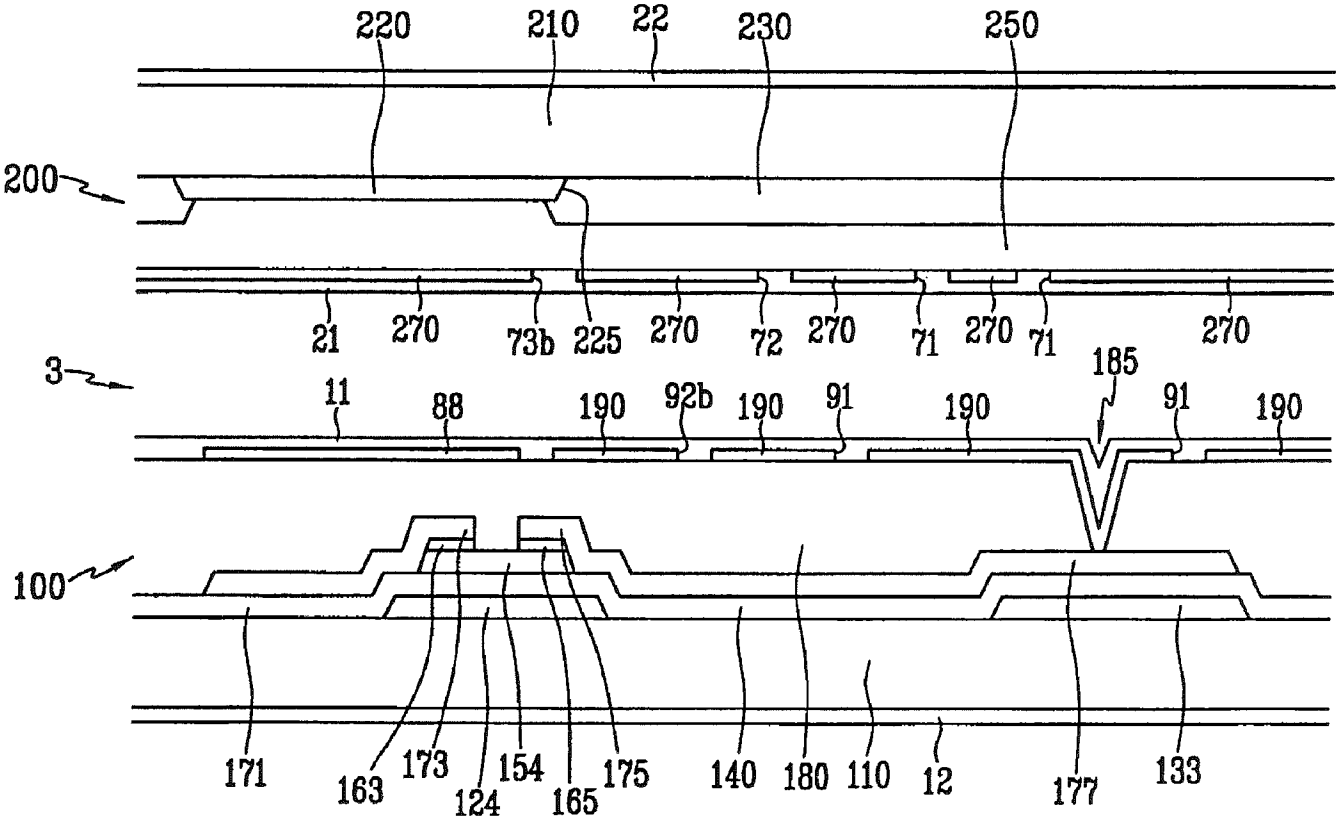
FIGS. 7 and 8 are cross-sectional views showing the liquid crystal display apparatus taken along lines VII-VII' and VIII-VIII' of FIG. 6, respectively.
Figure 8:
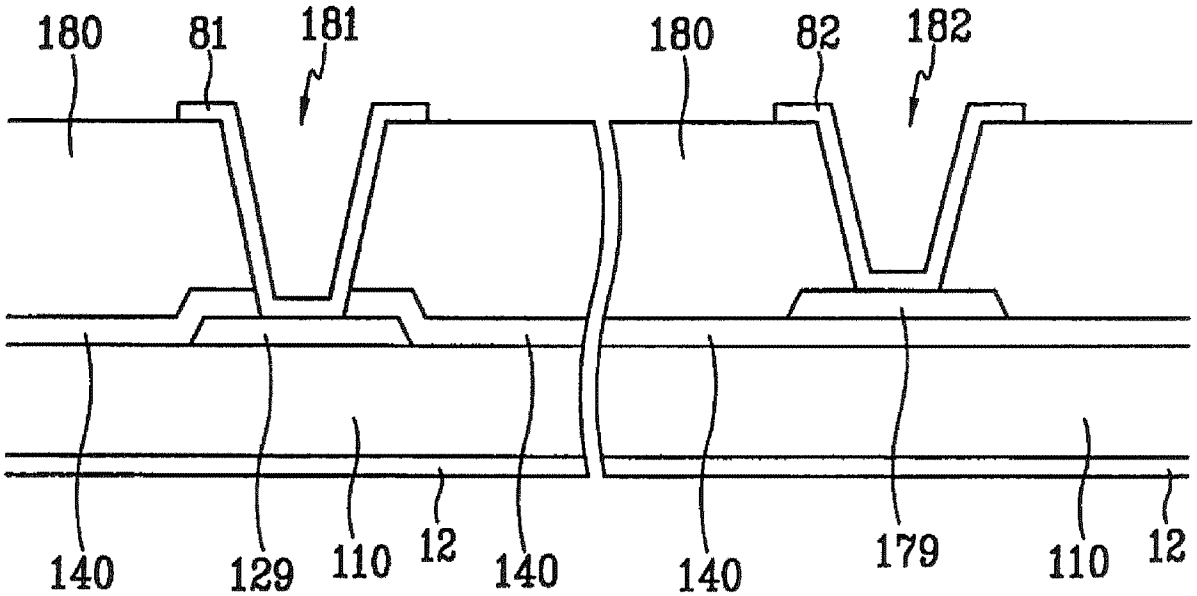

FIG. 4 is a plan view showing a layout of an exemplary embodiment of a thin film transistor panel for a liquid crystal display apparatus. FIG. 5 is a plan view showing a layout of an exemplary embodiment of a common electrode panel for a liquid crystal display. FIG. 6 is a plan view showing a layout of a liquid crystal display apparatus constructed with the thin film transistor panel of FIG. 4 and the common electrode panel of FIG. 5. FIGS. 7 and 8 are cross-sectional views showing the liquid crystal display apparatus taken along lines VII-VII' and VIII-VIII' of FIG. 6, respectively.

Referring to FIGS. 4 to 8, the liquid crystal display apparatus according to the exemplary embodiment includes a thin film transistor panel 100 and a common electrode panel 200 which face each other. A liquid crystal layer 3 is interposed between the two panels 100 and 200.

First, the thin film transistor panel 100 will be described in detail with reference to FIGS. 4 and 6 to 8.

A plurality of gate lines 121 and a plurality of storage electrode lines 131 are disposed on a dielectric substrate 110 made of transparent glass or the like.

The gate lines 121 extend mainly in a longitudinal direction and separated from each other to transmit gate signals. Each of the gate lines 121 includes a plurality of protrusions constituting a plurality of gate electrodes 124 and an end portion 129 having a wide area for connection to other layers or external apparatuses.

The storage electrode lines 131 extend mainly in a longitudinal direction and include a plurality of protrusions constituting storage electrodes 133. The storage electrodes 133 are substantially rectangular and have symmetry about the storage electrode lines 131. A predetermined voltage such as a common voltage applied to the common electrode 270 of the common electrode panel 200 of the liquid crystal display apparatus is applied to the storage electrode line 131.

The gate lines 121 and the storage electrode lines 131 may be made of an aluminum-based metal such as aluminum (Al) and an aluminum alloy, a silver-based metal such as silver (Ag) and a silver alloy, a copper-based metal such as copper (Cu) and copper alloy, a molybdenum-based metal such as molybdenum (Mo) and a molybdenum alloy, chromium (Cr), titanium (Ti), or tantalum (Ta), for example. However, the gate lines 121 and the storage electrode lines 131 may have a multi-layered structure including two conductive layers (not shown) having different physical properties. One of the two conductive layers is made of a metal having low resistivity, for example, an aluminum-based metal, a silver-based metal, and a copper-based metal, in order to reduce signal delay or voltage drop of the gate lines 121 and the storage electrode lines 131. The other conductive layer is made of a material having good adhesive characteristics with other materials, particularly ITO (indium tin oxide) and IZO (indium zinc oxide), such as a molybdenum-based metal, chromium, titanium, and tantalum. A preferred example of the combination includes a combination of a lower chromium layer and an upper aluminum layer and a combination of a lower aluminum layer and an upper molybdenum layer. However, the gate lines 121 and the storage electrode lines 131 may be made of various metals and conductive materials.

In addition, side surfaces of the gate lines 121 and the storage electrode lines 131 are slanted or angled with respect to a surface of the substrate 110, and it is preferable that the slant angle is in a range of about 30° to about 80°.

A gate insulating film 140 made of a silicon nitride $SiN_x$ or the like is formed on the gate lines 121 and the storage electrode lines 131.

A plurality of island-shaped semiconductors 154 made of a hydrogenated amorphous silicon (abbreviated to a-Si) are formed on the gate electrodes 124 above the gate insulating film 140.

A plurality of island-shaped ohmic contact members 163 and 165 made of a silicide or an n+ hydrogenated amorphous silicon or the like, which are doped with n-type impurities such as phosphorus (P), are formed above the semiconductors 154. The ohmic contact members 163 and 165 constitute pairs and are disposed on the semiconductors 154.

As seen in FIG. 7, side surfaces of the semiconductors 154 and the ohmic contact members 163 and 165 are also slanted or angled with respect to the surface of the substrate 110, and the slant angle is in a range of about 30° to about 80°.

A plurality of data lines 171 and a plurality of drain electrodes 175, which are separated from the plurality of data lines 171, are formed on the ohmic contact members 163 and 165 and the gate insulating film 140.

The data lines 171 extend mainly in the longitudinal direction (see FIGS. 4 and 6) to apply the data voltages. The data lines 171 include a plurality of straight line portions 172, a plurality of curved portions 173 connected between the straight line portions 172, and end portions 179 having an enlarged width for connection to other layers or external apparatuses.

As best seen with reference to FIGS. 4 and 6, the straight line portions 172 are aligned in a straight line to intersect the storage electrode lines 131. The straight line portions 172 together with the curved portions 173 intersect the gate lines 121. The curved portions 173 are disposed on the semiconductors 154 in a shape of rotated U-letter by 90° clockwise or counterclockwise (e.g., C-shaped) and constitute source electrodes. The straight line portions 172 are connected to two branches of the U-shaped curved portions 173.

The drain electrodes 175 extend from a bar-shaped end portion surrounded by the source electrode 173 in the longitudinal and transverse directions, and have an enlarged portion 177 having a wide area overlapping the storage electrode 133, as best seen in FIG. 4.

One of the gate electrodes 124, one of the source electrodes 173, and one of the drain electrodes 175 together with one of the semiconductors 154 constitute one of the thin film transistors ("TFT") Q. Channels of the thin film transistors Q are formed in the semiconductors 154 between the source electrodes 173 and the drain electrodes 175.

As described above, in order to form the apparent inversion as the dot inversion, even in a case where the driver inversion is the column inversion, the thin film transistors Q of one pixel column are alternately connected to the adjacent data lines 171. The inlets of the source electrodes 173 of one data line 171 are oriented alternately at the right and left sides with respect to the data line 171.

In this way, the source electrodes 173 are disposed along the extension line of the straight line portions 172 of the data line 171, so that it is possible to increase the aperture ratio.

The data lines 171 and the drain electrodes 175 are preferably made of chromium, a molybdenum-based metal, or a refractory metal such as tantalum and titanium, and may have a multi-layered structure. The multi-layered structure is constructed with a lower layer (not shown) made of the refractory metal and an upper layer (not shown) made of a low resistance material disposed thereon. As an example of the multi-layered structure, in addition to the aforementioned two-layered layer of a lower chromium or molybdenum layer and an upper aluminum layer, a three-layered structure comprises a molybdenum layer/an aluminum layer/a molybdenum layer.

Similar to the gate lines 121 and the storage electrode line 131, the side surfaces of the data lines 171 and the drain electrodes 175 are also slanted or angled at an angle ranging from about 30° to about 80°.

The ohmic contact members 163 and 165 are interposed between the underlying semiconductors 154 and the overlying source electrodes 173 and drain electrodes 175, respectively, and have a function of reducing contact resistance therebetween. The semiconductors 154 have exposed portions between the source electrodes 173 and the drain electrodes 175, and the exposed portions of the semiconductors 154 are disposed along the extension line of the straight line portions 172 of the data lines 171. On the other hand, the semiconductors can be further provided at the intersections between the gate lines 121 and the data lines 171, between the storage electrode lines 131 and the data lines 171, and at the intersections between the drain electrodes 175 and the storage electrodes 133. These semiconductors allow profiles at the intersections to become smooth, so that disconnection between the data lines 171 and the drain electrodes 175 can be prevented.

A protective film (passivation layer) 180 is formed on the data lines 171, the drain electrodes 175 and the exposed portions of the semiconductors 154. The protective film 180 is made of an inorganic material such as a silicon nitride and a silicon oxide, an organic material having an excellent planarization property and photosensitivity, and a low dielectric-constant insulating material formed with plasma enhanced chemical vapor deposition ("PECVD") such as a-Si:C:O and a-Si:O:F. However, in order to make use of the excellent properties of an organic film and protect the exposed portions of the semiconductors 154, the protective film 180 may have a two-layered structure of a lower inorganic film and an upper organic film.

In the protective film 180, a plurality of contact holes 182 and 185, which expose the enlarged portions 177 of the drain electrodes 175 and the end portions 179 of the data lines 171, are formed. In the protective film 180 and the gate insulating film 140, a plurality of contact holes 181, which expose the end portions 129 of the gate lines 121, are formed.

On the protective film 180, a plurality of the pixel electrodes 190, a plurality of shielding electrodes 88 and a plurality of contact assistant members 81 and 82 are formed. The pixel electrodes 190, the shielding electrodes 88 and the contact assistant members 81 and 82 are made of a transparent conductive material such as ITO and IZO or a reflective conductive material such as aluminum.

The pixel electrodes 190 are physically and electrically connected through the contact holes 185 to the drain electrodes 175 to receive data voltages from the drain electrodes 175.

The pixel electrodes 190 applied with the data voltages together with the common electrode 270 generate an electric field, so that alignment of the liquid crystal molecules of the liquid crystal layer 3 between the two electrodes 190 and 270 can be determined.

As described above, the pixel electrodes 190 and the common electrode 270 constitute the liquid crystal capacitors $C_{LC}$ to sustain the applied voltages even when the thin film transistors Q turn off. In order to increase the voltage storage capability, the storage capacitors $C_{ST}$connected in parallel to the liquid crystal capacitors $C_{LC}$ are constructed by overlapping the pixel electrodes 190 and the drain electrodes 175 connected thereto with the storage electrode 133.

Each of the pixel electrodes 190 has an outer boundary shaped substantially as a rectangle. The pixel electrode 190 has central cut portions 91, upper cut portions 92a and 93a, and lower cut portions 92b and 93b. The pixel electrode 190 is divided into a plurality of domains by the cut portions 91 to 93b. The cut portions 91 to 93b have approximate inversion symmetry with respect to the storage electrode line 131.

Referring to FIGS. 4 and 6, the upper and lower cut portions 92a and 92b extend in a slanted or angled direction from the left side of the pixel electrodes 190 to the right side thereof, and diverge toward each other. The upper and lower cut portions 93a and 93b extend in a slanted or angled direction from the upper and lower sides of the pixel electrodes 190 to the right side thereof, and also diverge toward each other. The upper cut portions 92a and 93a and the lower cut portions 92b and 93b are disposed in upper and lower half regions, respectively, of the pixel electrode 190 divided by the storage electrode 133, and make an angle of about 45° with respect to the gate lines 121 to extend perpendicular to each other.

The central cut portions 91 extend in a slanted or angled direction from the storage electrode 133 to the left side, and have a pair of slanted branches which are substantially parallel to the upper cut portion 92a and 93a and the lower cut portions 92b and 93b. The central cut portions 91 also make an angle of about 45° with respect to the gate lines 121 and the central cut portions 91 also extend perpendicular to each other.

Accordingly, each of the upper and lower half regions of the pixel electrodes 190 is divided into four domains by the cut portions 91 to 93b. Here, the number of domains or the number of cut portions may vary according to a size of a pixel, an aspect ratio of the pixel electrodes 190, a type or characteristics of the liquid crystal layer 3 or other design factors.

The pixel electrode 190 overlaps the adjacent gate lines 121, thus increasing an aperture ratio thereof.

The shielding electrodes 88 extend along the data lines 171 and gate lines 121. Portions of the shielding electrodes 88 disposed over the data lines 171 cover the entire portions of the straight line portions 172 of the data lines 171, and most of the curved portions 173 thereof. Therefore, the shielding electrodes 88 cover most areas of the thin film transistors Q, and particularly, they substantially cover most areas of the exposed portions of the semiconductors 154. The portions of the shielding electrodes 88 disposed over the gate lines 121 have a smaller width than widths of the gate lines 121 and are disposed within boundaries of the gate lines 121. The straight line portions 172 of the data lines 171 disposed between the two adjacent pixel electrodes 190 are entirely covered with the shielding electrodes 88. However, the widths thereof may be adjusted to be smaller than those of the straight line portions 172 of the data lines 171, and boundary lines thereof may be located outside the boundaries of the gate lines 121. In order to apply a common voltage to the shielding electrodes 88, the shielding electrodes 88 may be connected through contact holes (not shown) of the protective film 180 and the gate insulating film 140 to the storage electrode line 131 or a short point (not shown) through which the common voltage is transmitted from the thin film transistor panel 100 to the common electrode panel 200. Here, it is preferable that a distance between the shielding electrode 88 and the pixel electrode 190 is minimized in order to minimize a decrease in the aperture ratio.

In this manner, if the shielding electrodes 88 applied with the common voltage are disposed over the data lines 171, the shielding electrodes 88 shield the electric field generated between the data lines 171 and the pixel electrodes 190 and between the data lines 171 and the common electrode 270, thereby reducing voltage distortion of the pixel electrodes 190 and signal delay and distortion of data voltage transmitted by the data lines 171.

In addition, since the pixel electrodes 190 and the shielding electrodes 88 are separated from each other by a distance in order to prevent a short-circuit therebetween, the pixel electrodes 190 can be further separated from the data lines 171, thus reducing parasitic capacitance therebetween. In addition, since permittivity of the liquid crystal layer 3 is higher than that of the protective film 180, a parasitic capacitance between the data lines 171 and the shielding electrodes 88 is not much higher than the parasitic capacitance between the data lines 171 and common electrode 270 in a case where the shielding electrode 180 is not provided.

Further, since the pixel electrodes 190 and the shielding electrodes 88 are constructed at the same layer, the distance therebetween can be uniformly maintained, so that the parasitic capacitance therebetween is uniform.

However, the shielding electrodes 88 may be omitted as needed.

The contact assistant members 81 and 82 are connected through the contact holes 181 and 182 to the end portions 129 of the gate lines 121 and the end portions 179 of the data lines 171, respectively. The contact assistant members 81 and 82 have a function of compensating for adhesiveness of the exposed end portions 129 of the gate lines 121 and the exposed end portions 179 of the data lines 171 to external apparatuses and a function of protecting these portions.

On the pixel electrodes 190, the contact assistant members 81 and 82 and the protective film 180, an alignment film 11 for aligning the liquid crystal layer 3 is coated. The alignment film 11 may be a vertical alignment film.

Now, the common electrode panel 200 will be described with reference to FIGS. 5 to 8.

A light-shielding member 220 for preventing light leakage, which is called a black matrix, is formed on a dielectric substrate 210 made of a transparent glass or the like (FIG. 7). The light-shielding member 220 includes a plurality of opening portions 225 which face the pixel electrodes 190 and have substantially the same shape as the pixel electrodes 190. Alternatively, the light-shielding member 220 may be constructed with portions corresponding to the data lines 171 and portions corresponding to the thin film transistors Q. However, the light-shielding member 220 may have various shapes in order to shield the light leakage in a vicinity of the pixel electrodes 190 and the thin film transistors Q.

A plurality of color filters 230 are formed on the substrate 210. The color filters 230 are disposed in most regions surrounded by the light-shielding member 220, and extend along the pixel electrodes 190 in the transverse direction. The color filters 230 can display one of three colors such as red, green and blue, including primary colors.

A cover film 250 is formed on the color filters 230 and the light-shielding member 220 in order to prevent the color filters 230 from being exposed and to provide a planarized surface. A common electrode 270 made of a transparent conductive material such as ITO and IZO is formed on the cover film 250.

As best seen with reference to FIG. 5, the common electrode 270 includes a plurality of pairs of cut portions 71 to 74b. A pair of the cut portions 71 to 74b faces one of the pixel electrodes 190 and includes central cut portions 71 and 72, upper cut portions 73a and 74a, and lower cut portions 73b and 74b. The cut portions 71 to 74b are disposed between the adjacent cut portions 91 to 93b of the pixel electrode 190 and edge cut portions 93a and 93b and the sides of the pixel electrode 190 (FIG. 6). In addition, each of the cut portions 71 to 74b includes at least one slanted or angled portion which extends in parallel to the respective cut portions 91 to 93b of the pixel electrodes 190.

Each of the upper and lower cut portions 73a to 74b includes a slanted or angled portion which extends from the right side of the pixel electrode 190 and toward the lower or upper side thereof, and longitudinal and transverse portions which extend from the ends of the slanted or angled portion along the sides of the pixel electrode 190 with an obtuse angle with respect to the slanted or angled portion and overlaps the sides of the pixel electrode 190 (see FIGS. 5 and 6).

The central cut portion 71 includes a pair of slanted or angled portions which extend from the storage electrode 133 and toward the left side of the pixel electrode 190 with an slanted angle with respect to the storage electrode 133. Distal longitudinal portions which extend from the ends of the slanted or angled portions along the left sides of the pixel electrode 190 forming an obtuse angle with respect to the slanted or angled portions and overlap the left side of the pixel electrode 190. The central cut portion 72 includes a longitudinal portion which extends along the right side of the pixel electrode 190 and overlaps the right side of the pixel electrode 190. A pair of slanted or angled portions extend from the ends of the longitudinal portion toward the left side of the pixel electrode 190, and distal longitudinal portions extend from the ends of the slanted or angled portions along the left side of the pixel electrode 190 forming an obtuse angle with respect to the slanted or angled portions and overlaps the left side of the pixel electrode 190.

The number of the cut portions 71 to 74b may vary according to the design factors, and the light-shielding member 220 overlaps the cut portions 71 to 74b to shield light leakage in a vicinity of the cut portions 71 to 74b, as best seen in FIG. 7.

Since the same common voltage is applied to the common electrode 270 and the shielding electrodes 88, no electric field is generated therebetween. Accordingly, the liquid crystal molecules disposed between the common electrode 270 and the shielding electrodes 88 maintain an initial vertically aligned state, so that light incident to these regions cannot be transmitted and is shielded.

An alignment film 21 for aligning the liquid crystal layer 3 is coated on the common electrode 270 and the cover film 250. The alignment film 21 may be a vertical alignment film.

Polarizing plates 12 and 22 are provided on outer surfaces of the panels 100 and 200. Transmitting axes of the two polarizing plates 12 and 22 are perpendicular to each other, and one of the transmitting axes (or absorbing axes) is in parallel to the longitudinal direction. In the case of a reflective type of liquid crystal display apparatus, one of the two polarizing plates 12 and 22 may be omitted.

The liquid crystal layer 3 has negative anisotropic permittivity, and the liquid crystal molecules of the liquid crystal layer 3 are aligned such that major axes thereof are perpendicular to the surfaces of the two panels when no electric field is applied to the liquid crystal molecules.

When the common voltage and the data voltage are applied to the common electrode 270 and the pixel electrodes 190, an electric field is generated in a direction substantially perpendicular to the surfaces of the panels 100 and 200. The cut portions 91 to 93b and 71 to 74b of the electrodes 190 and 270, respectively, distort the electric field to generate a horizontal component, which is perpendicular to the sides of the cut portions 91 to 93b and 71 to 74b.

Accordingly, the electric field is oriented in a direction that is slanted or angled with respect to a direction perpendicular to the surfaces of the panels 100 and 200.

In response to the electric field, the liquid crystal molecules have a tendency to change the major axis direction to be perpendicular to the direction of the electric field. At this time, since the electric field in a vicinity of the cut portions 91 to 93b and 71 to 74b and the sides of the pixel electrode 190 has a predetermined angle which is not in parallel to the major axis direction of the liquid crystal molecules, the liquid crystal molecules rotate in such a direction that the moving distance on the surface formed by the major axis direction of the liquid crystal molecules and the electric field is short. Therefore, one group of the cut portions 91 to 93b and 71 to 74b and the sides of the pixel electrode 190 divide the region of the liquid crystal layer 3 located on the pixel electrode 190 into a plurality of domains where the liquid crystal molecules have different tilted angles, thus making it is possible to increase a reference viewing angle.

At least one of the cut portions 91 to 93b and 71 to 74b may be replaced with protrusions or recessed portions, and the shape and arrangement of the cut portions 91 to 93b and 71 to 74b may be modified.

Now, another exemplary embodiment of a liquid crystal display apparatus according to the present invention will be described in detail with reference to FIGS. 9 and 10.

Figure 9:
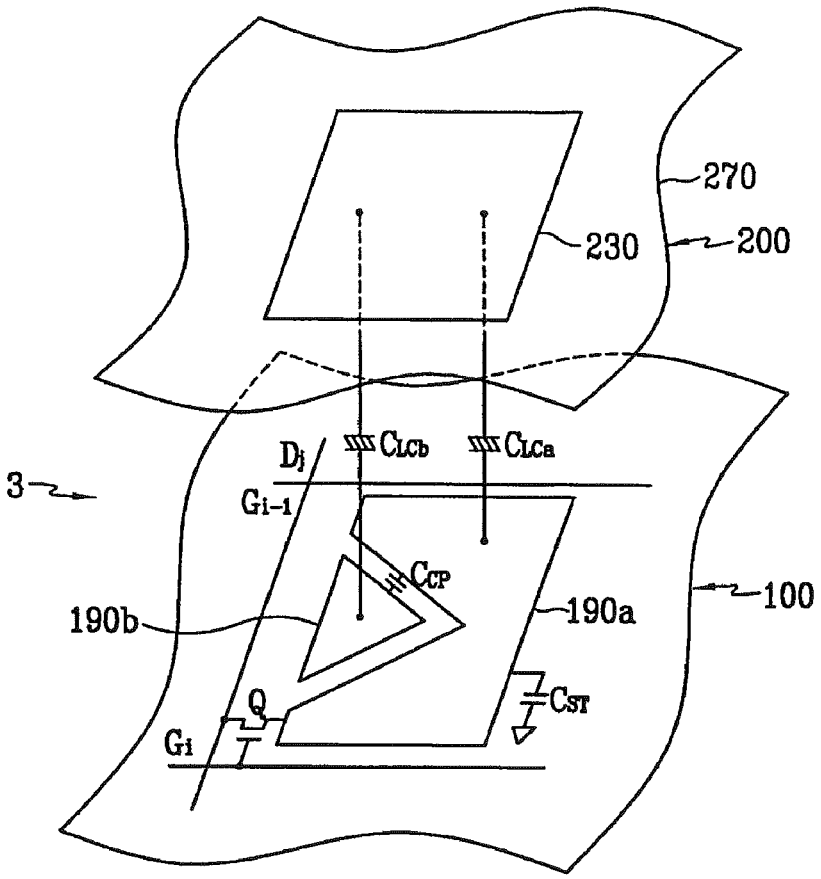
FIG. 9 is an equivalent schematic circuit diagram showing another exemplary embodiment of a pixel of a liquid crystal display apparatus according to the present invention.

FIG. 9 is an equivalent circuit schematic diagram showing another exemplary embodiment of a pixel of a liquid crystal display apparatus according to the present invention. FIG. 10 is a schematic plan view showing another exemplary embodiment of a switching device array and polarity of pixels in the liquid crystal display apparatus according to the present invention.

Similar to the aforementioned liquid crystal display apparatus, the liquid crystal display apparatus according to the present alternative exemplary embodiment of the present invention includes a liquid crystal display panel assembly 300, a gate driver 400, a data driver 500, a signal controller 600, and the like. The liquid crystal display panel assembly 300 includes a plurality of gate lines $G_1$ to $G_n$, a plurality of data lines $D_1$ to $D_m$, and a plurality of pixels. Therefore, description of the same components as the above-described ones is omitted, and only the different components are described in detail herein below.

As shown in FIG. 9, each pixel of the liquid crystal display apparatus according to the embodiment includes a switching device Q connected to gate lines $G_1$ to $G_n$ and data lines D1 to $D_m$, a first liquid crystal capacitor $C_{LCa}$ and a storage capacitor $C_{ST}$ connected thereto, a coupling capacitor $C_{CP}$ connected to the first liquid crystal capacitor $C_{LCa}$, and a second liquid capacitor $C_{LCb}$ connected thereto. The storage capacitor $C_{ST}$ may be omitted as needed.

Two ports of each of the first and second liquid crystal capacitors $C_{LCa}$ and $C_{LCb}$ are first and second sub-pixel electrodes 190a and 190b, respectively, of the lower display panel 100 and a common electrode 270 of the upper display panel 200. The liquid crystal layer 3 interposed between the two electrodes 190a/190b and 270 serves as a dielectric member. The first sub-pixel electrode 190a is connected to the switching device Q, and the coupling capacitor $C_{CP}$ is formed between the first and second sub-pixel electrodes 190a and 190b.

The first sub-pixel electrode 190a is applied with the data voltage through the switching device Q, but the second sub-pixel electrode 190b is capacitively-coupled with the first sub-pixel electrode 190a through the coupling capacitor $C_{CP}$ so as to be applied with a voltage. In the liquid crystal display apparatus according to the present alternative exemplary embodiment, the voltage of the second sub-pixel electrode 190b is always lower than that of the voltage of the first sub-pixel electrode 190a. Namely, assuming that the voltages of the first and second sub-pixel electrodes 190a and 190b with respect to a voltage of the common electrode 270 are denoted by Va and Vb, respectively, the following equation is obtained according to the voltage division rule.

$$Vb=Va^{x}[C_{CP}/(C_{CP}+C_{LCb})]$$

Here, since $C_{CP}/(C_{CP}+C_{LCb})$ is always lower than 1, Vb is always lower than Va.

In this way, the two sub-pixel electrodes 190a and 190b are provided within one pixel, and the coupling capacitor $C_{CP}$ is disposed between the sub-pixel electrodes 190a and 190b, so that these sub-pixel electrodes can be charged with different voltages.

Accordingly, a side gamma curve can be close to a front gamma curve due to the two sub-pixel electrodes 190a and 190b by adjusting the coupling capacitor $C_{CP}$ or the like, thus making it is possible to improve lateral or side visibility.

Figure 10:
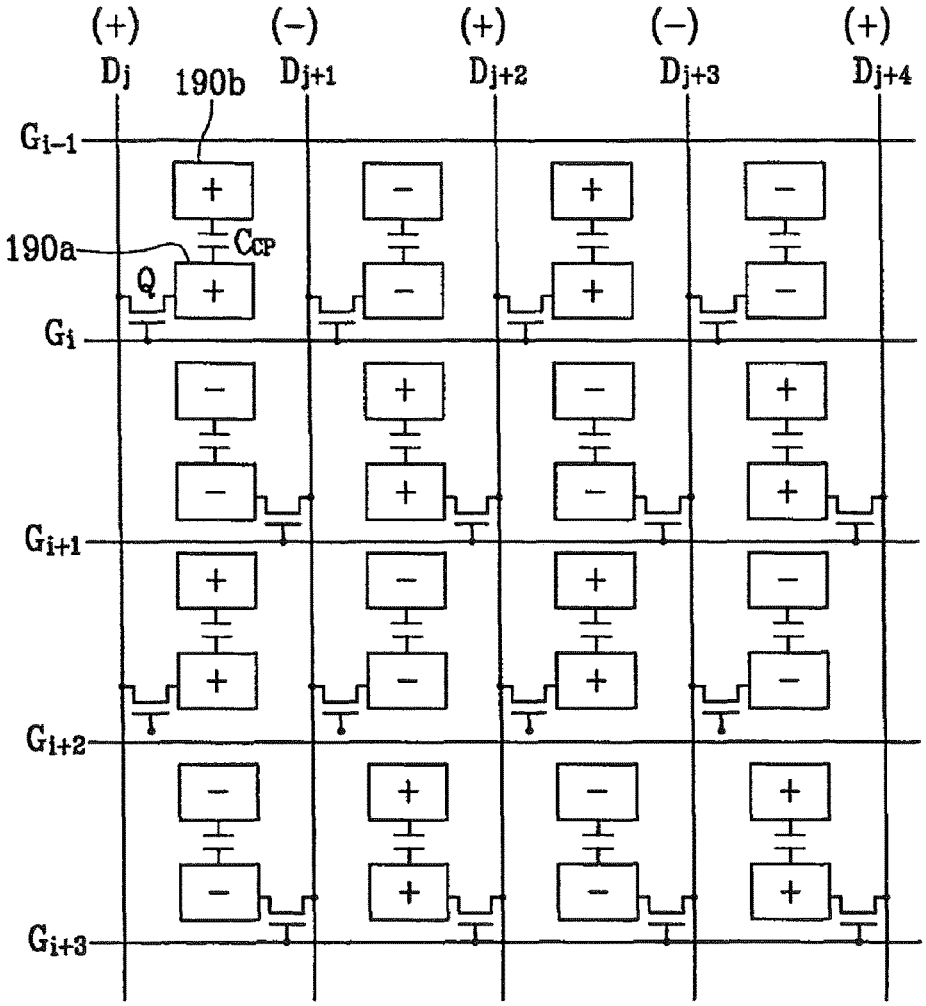
FIG. 10 is a schematic plan view showing another exemplary embodiment of a switching device array and polarity of pixels in the liquid crystal display apparatus according to the present invention.

On the other hand, similar to the above-described embodiment, as shown in FIG. 10, the positions of the switching devices Q of the pixels PX in the liquid crystal display apparatus according to the present alternative exemplary embodiment change every pixel row. Namely, in the adjacent rows of pixels, the switching devices Q are alternately connected to the data lines of the different sides. Among the four pixel rows of pixels shown in FIG. 10, the switching devices Q of the uppermost pixel row and the third pixel row are connected to the left data lines, and on the contrary, the switching devices Q of the second pixel row and the fourth pixel row are connected to the right data lines. Therefore, the driver inversion becomes column inversion, but the apparent inversion becomes 1×1 dot inversion.

Accordingly, it is possible to eliminate transverse line flicker. In addition, it is possible to increase a charging rate of pixels.

Now, an example of the liquid crystal display apparatus will be described in detail with reference to FIGS. 11 to 13.

Figure 11:
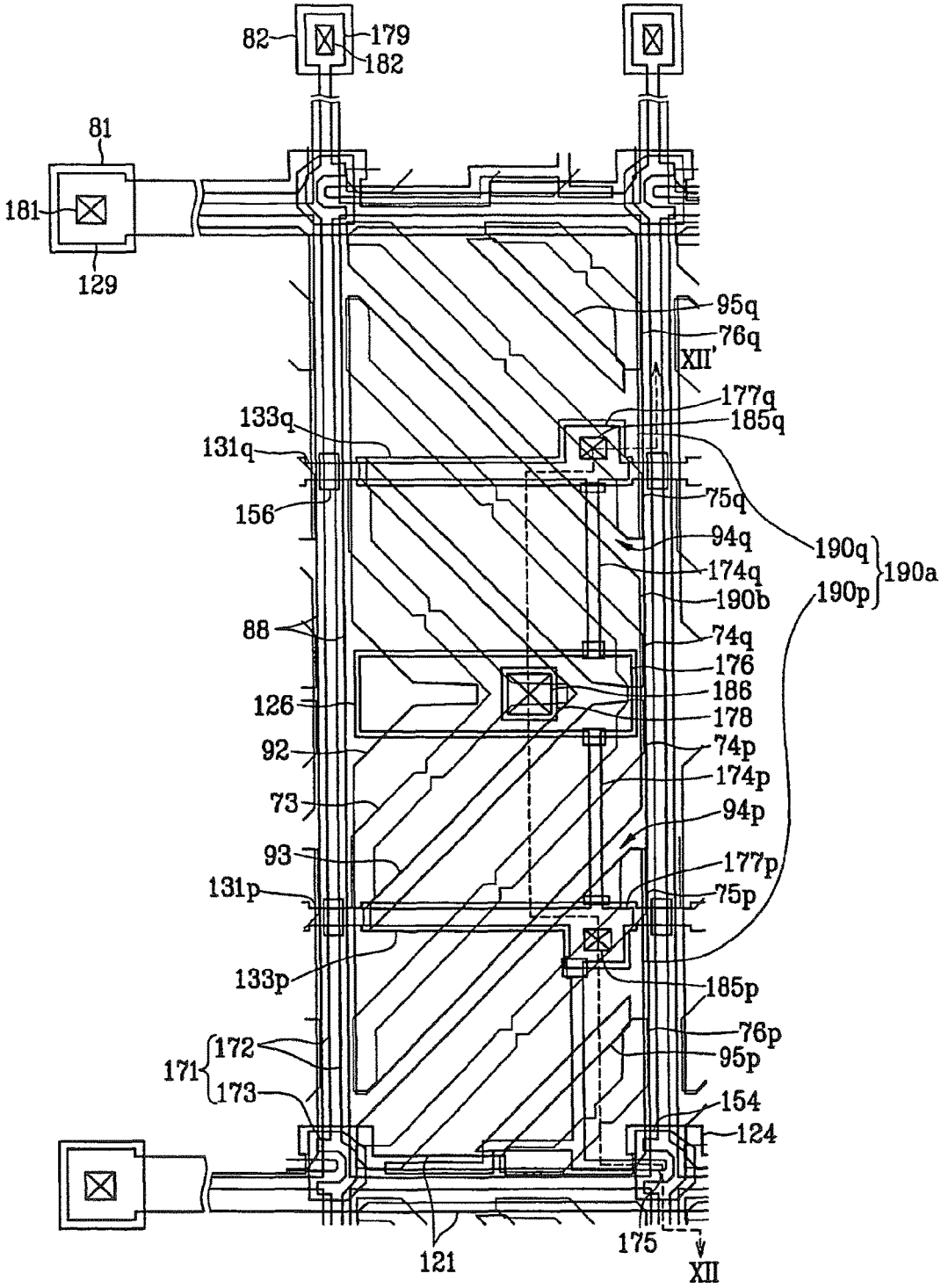
FIG. 11 is a plan view showing another exemplary embodiment of a layout of the liquid crystal display apparatus according to the present invention.

FIG. 11 is a plan view showing a layout of another exemplary embodiment of a liquid crystal display apparatus according to the present invention. FIG. 12 is a cross-sectional view showing the liquid crystal display apparatus taken along line XII-XII' of FIG. 11. FIG. 13 is a plan view showing a layout of some layers of the liquid crystal display apparatus of FIG. 11.

Figure 12:
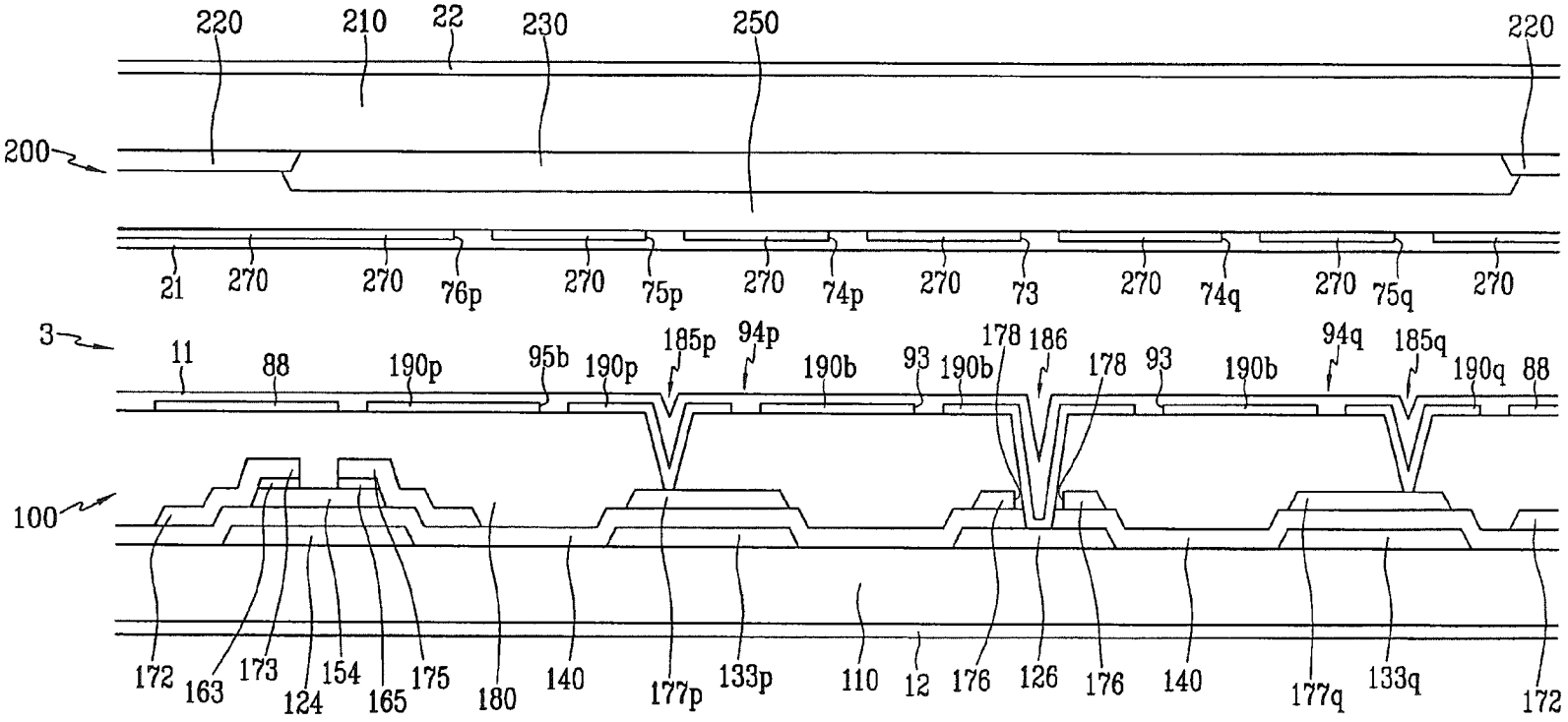
FIG. 12 is a cross-sectional view showing the liquid crystal display apparatus taken along line XII-XII' of FIG. 11.

As shown in FIGS. 11 to 12, since a layered structure of the liquid crystal display apparatus according to the present exemplary embodiment is substantially the same as the layered structure of the liquid crystal display apparatus shown in FIGS. 4 to 8, description of the same components is omitted, but only the different components are described herein below.

First, in the thin film transistor panel 100, a plurality of gate lines 121 including a plurality of gate electrodes 124, a plurality of pairs of storage electrode lines 131p and 131q, and a plurality of coupling electrodes 126 are formed on a dielectric substrate 110 (see FIG. 12).

The storage electrode lines 131p and 131q extend mainly in a transverse direction (FIGS. 11 and 13), and include a plurality of storage electrodes 133p and 133q which extend from the storage electrode lines 131p and 131q in up and down directions thereof providing a wide area. The storage electrodes 133p and 133q further include protrusions which protrude in down and up directions, respectively (see FIGS. 11 and 13).

The coupling electrodes 126 are separated by a predetermined interval between the storage electrode lines 131p and 131q, and are also separated from the gate lines 121. The coupling electrodes 126 are substantially rectangularly shaped, but the shape thereof can be different.

A gate insulating film 140, a plurality of semiconductors 154 and 156, and a plurality of island-shaped ohmic contact members 163 and 165 are sequentially formed on the gate lines 121, the storage electrode lines 131p and 131q, and the coupling electrodes 126.

A plurality of data lines 171 and a plurality of drain electrodes 175 are formed on the ohmic contact members 163 and 165 and the gate insulating film 140.

As best seen with reference to FIGS. 12 and 3, each of the data lines 171 includes a plurality of straight line portions 172, a plurality of curved portions 173 constituting source electrodes, and an end portion 179 having a wide area.

Each of the drain electrodes 175 includes enlarged portions 177p, 177q, and 176, which overlap with the storage electrodes 133p and 133q and the coupling electrodes 126, respectively. In addition, each of the drain electrodes 175 includes longitudinal portions 174p and 174q, which are connected between the enlarged portions 177p and 177q and the enlarged portion 176, respectively (FIG. 11).

Referring to FIG. 12, the enlarged portion 176 of the drain electrode 175 has an opening 178. The semiconductors 156 are formed at intersections between the storage electrode lines 131p and 131q and the data lines 171 and at intersections between the storage electrodes 133p and 133q, the coupling electrodes 126, and the drain electrodes 175.

A protective film 180 is formed on the data lines 171, the drain electrodes 175 and exposed portions of the semiconductors 154. In the protective film 180, a plurality of contact holes 182, 185p, and 185q which expose the end portions 179 of the data lines 171 and the enlarged portions 177p and 177q of the drain electrodes 175 are formed, and in the protective film 180 and the gate insulating film 140, a plurality of contact holes 181 and 186 which expose the end portions 129 of the gate lines 121 and the coupling electrodes 126 are formed.

On the protective film 180, a plurality of the pixel electrodes 190 including the first and second sub-pixel electrodes 190a and 190b, the shielding electrodes 88, and a plurality of the contact assistant members 81 and 82 are formed.

As best seen with reference to FIG. 11, the first sub-pixel electrode 190a includes trapezoidal portions 190p and 190q, which are disposed in upper and lower half regions of the pixel with respect to the coupling electrode 126 and are symmetrically separated from each other. The trapezoidal portions 190p and 190q of the first sub-pixel electrode 190a are physically and electrically connected through the contact holes 185p and 185q to the enlarged portions 177p and 177q of the drain electrode 175, so that the first sub-pixel electrode 190a is applied with the data voltage from the drain electrode 175. The first pixel electrode 190a applied with the data voltage together with the common electrode 270 generates an electric field, and as described above with reference to FIG. 9, the two electrodes 190a and 270 constitute the first liquid crystal capacitor $C_{LCa}$.

The coupling capacitor $C_{CP}$ is constructed by overlapping the enlarged portion 176 of the drain electrode 175 and the coupling electrode 126. The coupling capacitor $C_{CP}$ transmits a voltage lower than the data voltage from the drain electrode 175 to the coupling electrode 126.

The second sub-pixel electrode 190b is physically and electrically connected through the contact hole 186 to the coupling electrode 126, so that the second sub-pixel electrode 190b is applied with a voltage lower than the data voltage from the coupling electrode 126. The second sub-pixel electrode 190b applied with such a voltage together with the common electrode 270 generates an electric field, and the two electrodes 190b and 270 constitute the second liquid crystal capacitor $C_{LCb}$.

A pair of the first and second sub-pixel electrodes 190a and 190b constituting the pixel electrode 190 face each other with gaps 94p and 94q interposed therebetween. An outer boundary of the pixel electrode 190 is substantially rectangularly shaped. The right sides of the trapezoidal portions 190p and 190q of the first sub-pixel electrode 190a are longer than the left sides thereof, and each of the trapezoidal portions 190p and 190q have slanted sides forming an angle of about 45° with respect to the gate line 121. The second sub-pixel electrode 190b has a shape of a rotated equilateral trapezoid, which has a left side longer than a right side and a pair of upper and lower sides facing the slanted sides of the first sub-pixel electrode 190a. The gaps 94p and 94q between the first and second sub-pixel electrodes 190a and 190b have a substantially uniform width. Hereinafter, for the convenience of description, the gaps 94p and 94q are denoted as cut portions.

The pixel electrode 190 has central cut portions 92 and 93, lower cut portions 94p and 95p, and upper cut portions 94q and 95q. The pixel electrode 190 is divided into a plurality of domains by the cut portions 92 to 95q. The cut portions 92 to 95q have approximate inversion symmetry with respect to the coupling electrode 126.

The lower and upper cut portions 94p and 94q extend in a slanted direction from the left side of the pixel electrode 190 to the right side thereof, and the lower and upper cut portions 95p and 95q extend in a slanted or angled direction from the lower and upper sides of the pixel electrodes 190 to the right side thereof. The lower cut portions 94p and 95p and the upper cut portions 94q and 95q are disposed in lower and upper half regions, respectively, of the pixel electrode 190 divided by the coupling electrode 126, and form an angle of about 45° with respect to the gate line 121 to extend perpendicular to each other.

The central cut portion 92 has an inlet at the left side of the second sub-pixel electrode 190b, and a transverse portion which extends from the inlet along the coupling electrode 126. The inlet of the cut portion 92 has a pair of slanted or angled portions having an angle of about 45° with respect to the gate line 121. The central cut portion 93 has a central transverse portion which extends substantially from the right side of the second sub-pixel electrode 190b in the transverse direction and a pair of slanted or angled portions which extend from the end of the central transverse portion with a slanted angle with respect to the central transverse portion toward the left side of the pixel electrode 190.

An alignment film 11 is coated on the pixel electrodes 190, the shielding electrode 88, the contact assistant members 81 and 82 and the protective film 180.

In the common electrode panel 200, shielding members 220, a plurality of color filters 230, a cover film 250, a common electrode 270 having a plurality of cut portions 73, 74p, 74q, 75p, 75q, 76p, and 76q, and an alignment film 21 are formed on a dielectric substrate 210.

The cut portions 73 to 76q of the common electrode 270 include the central cut portion 73 which is located across the lower and upper half regions of the pixel electrode 190, the cut portions 74p, 75p, and 76p which are located in the lower half region, and the cut portions 74q, 75q, and 76q which are located in the upper half region.

The aforementioned features of the liquid crystal display apparatus of FIGS. 4 to 8 may be applied to the liquid crystal display apparatus of FIGS. 11 and 12.

Figure 13:
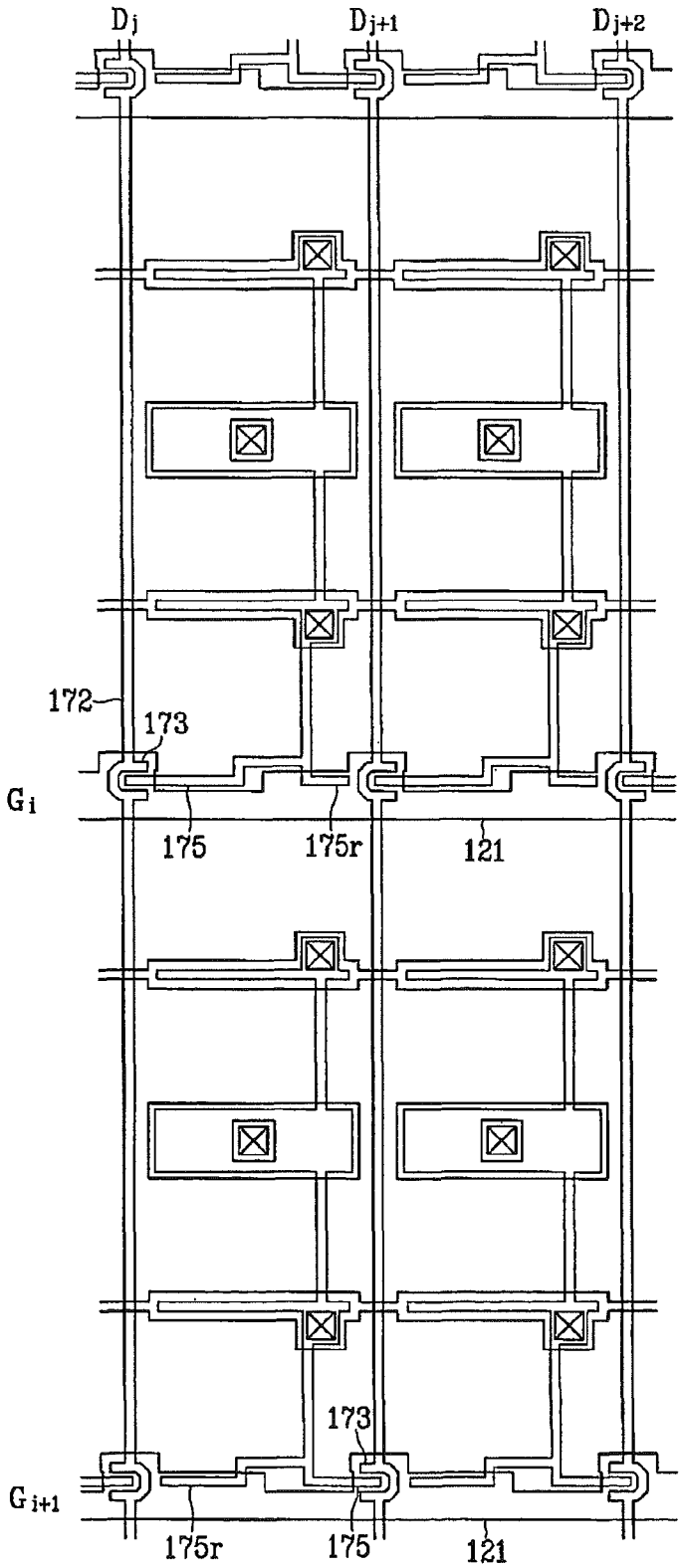
FIG. 13 is a plan view showing a layout of some layers of the liquid crystal display apparatus of FIG. 11.

In FIG. 13, the thin film transistor panel 100 including the four pixels shown in FIG. 11 is schematically shown. In order to clarify the features of the present invention, a gate metal layer, a data metal layer, and the like are shown, and the pixel electrodes are not shown.

As shown in FIG. 13, for example, in the i-th pixel row, the thin film transistors are located at the left side of the pixels. The inlets of the curved portions 173 of the data line 171 are oriented to the right side. The drain electrodes 175 extend from the inlets of the curved portions in the longitudinal and transverse directions and have enlarged portions 177p, 177q, and 176 (see FIG. 11). In addition, the drain electrode 175 has an extension portion 175r, which extends from the longitudinal portion connected to the enlarged portion 177p in the down direction to the curved portions 173 of the adjacent data line 171.

On the contrary, in the (i+1)-th pixel row, the thin film transistors are located at the right side of the pixels. The inlets of the curved portions 173 of the data line 171 are oriented to the left side. However, similar to the i-th pixel row, the drain electrode 175 has an extension portion 175r which extends from the longitudinal portion connected to the enlarged portion 177p in the down direction to the curved portions 173 of the adjacent data line 171.

On the other hand, the pixel-electrode formed on the data metal layer has the same cut portions for every pixel.

By forming the thin film transistors Q and the drain electrodes 175 in such a manner, the shapes and areas of the domains of the pixels can be substantially uniform even in a case where the positions of the thin film transistors Q change every pixel row. Therefore, the inversion driving scheme according to the present invention can be applied to a PVA mode having a plurality of domains.

Accordingly, it is possible to obtain a wide viewing angle and to improve side or lateral visibility.

Now, a liquid crystal display apparatus according to other exemplary embodiments of the present invention will be described in detail with reference to FIGS. 14A and 16. In the present exemplary embodiments, detailed description of the same components as the above-described embodiment will be omitted.

Figure 14A:
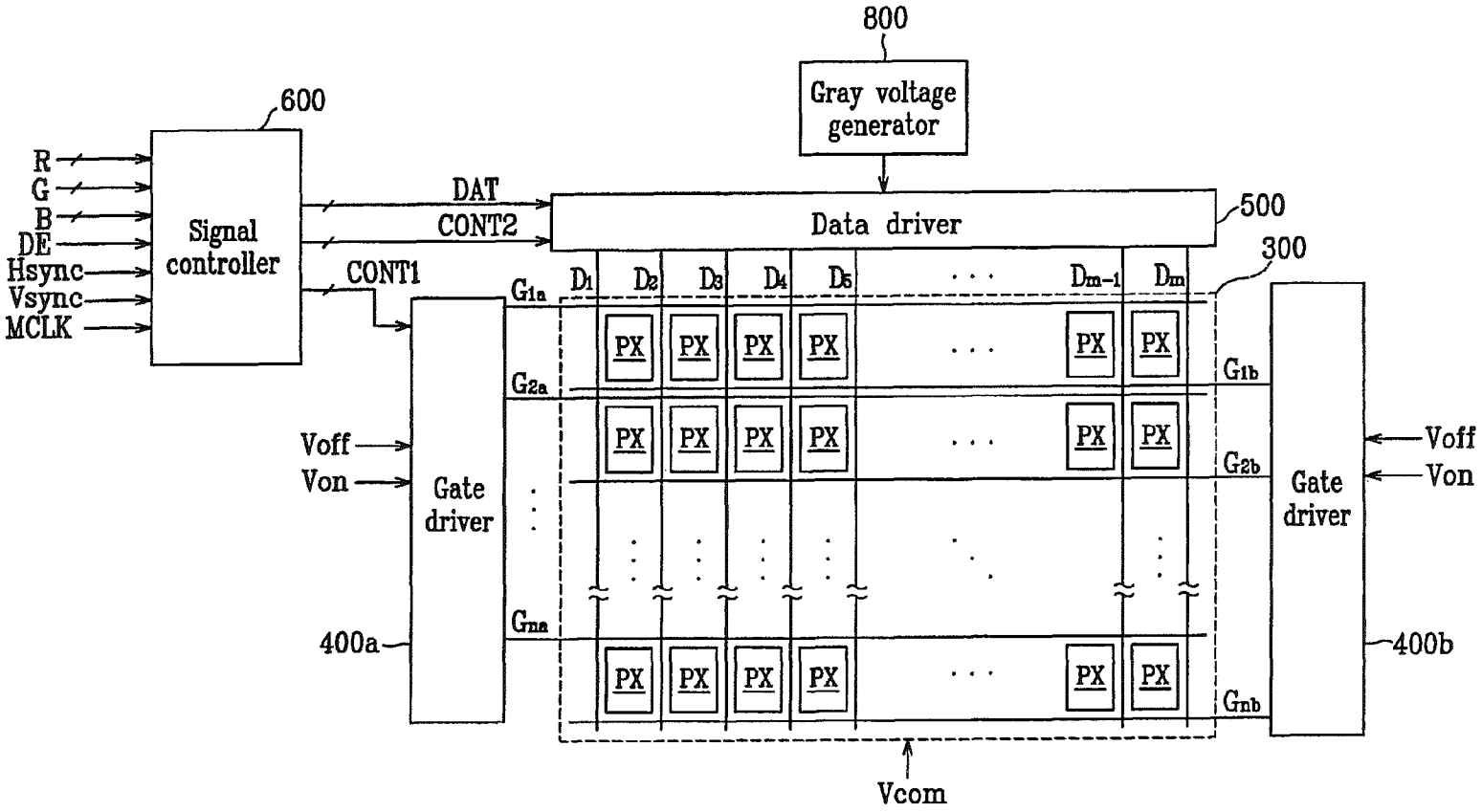
FIGS. 14A to 14C are block diagrams of another exemplary embodiment of a liquid crystal display apparatus according to the present invention.
Figure 14B:
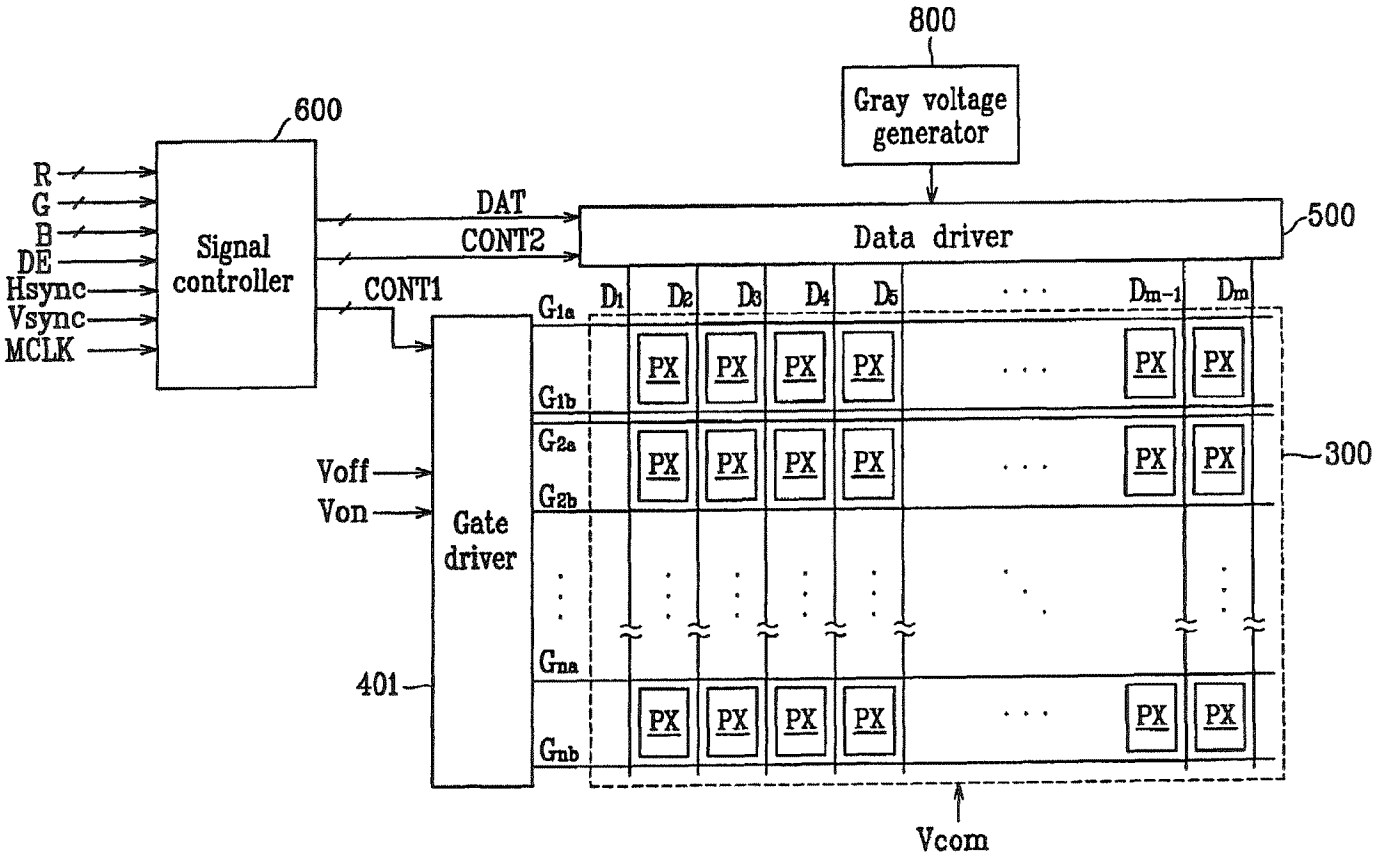
Figure 14C:
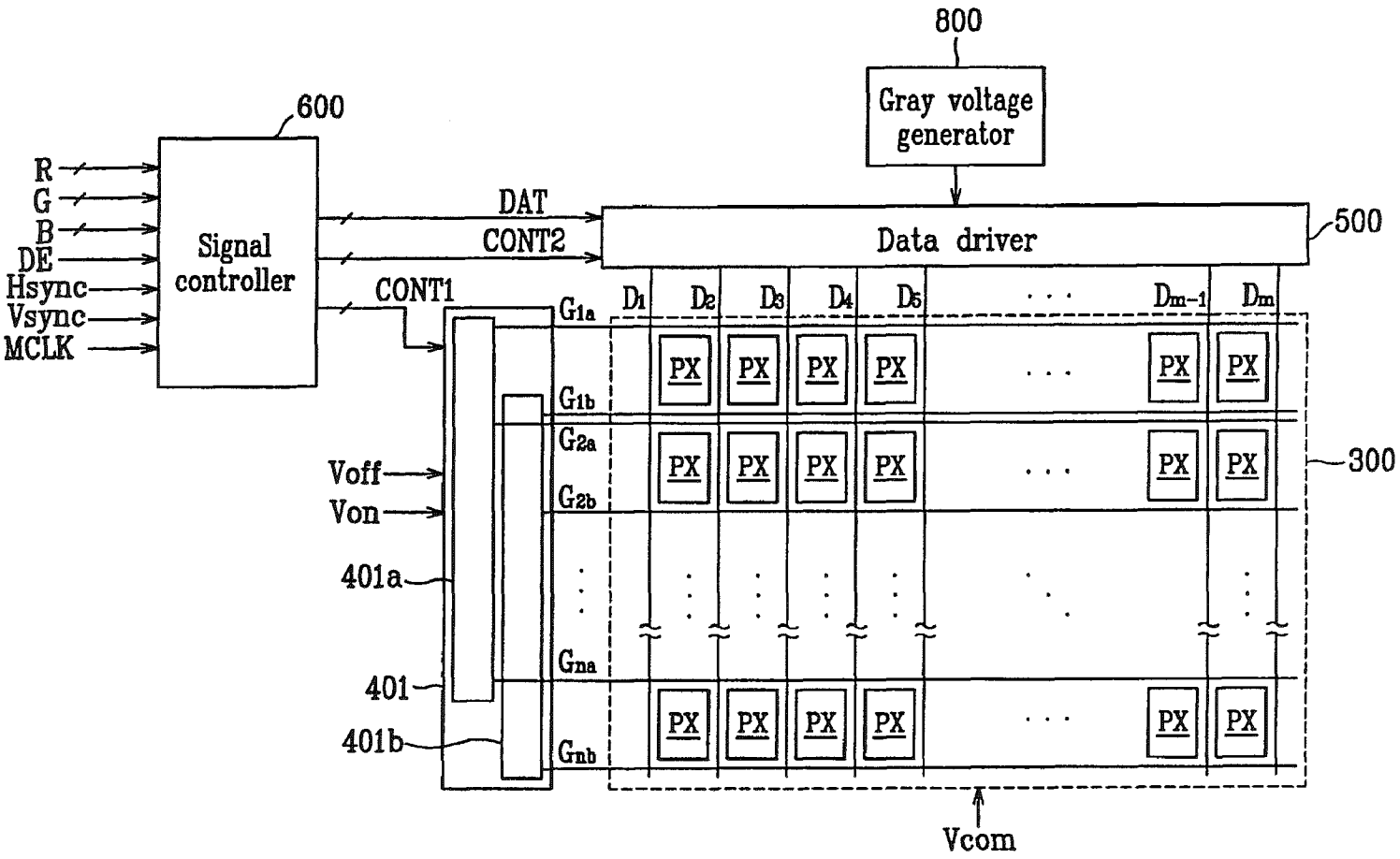
Figure 15:
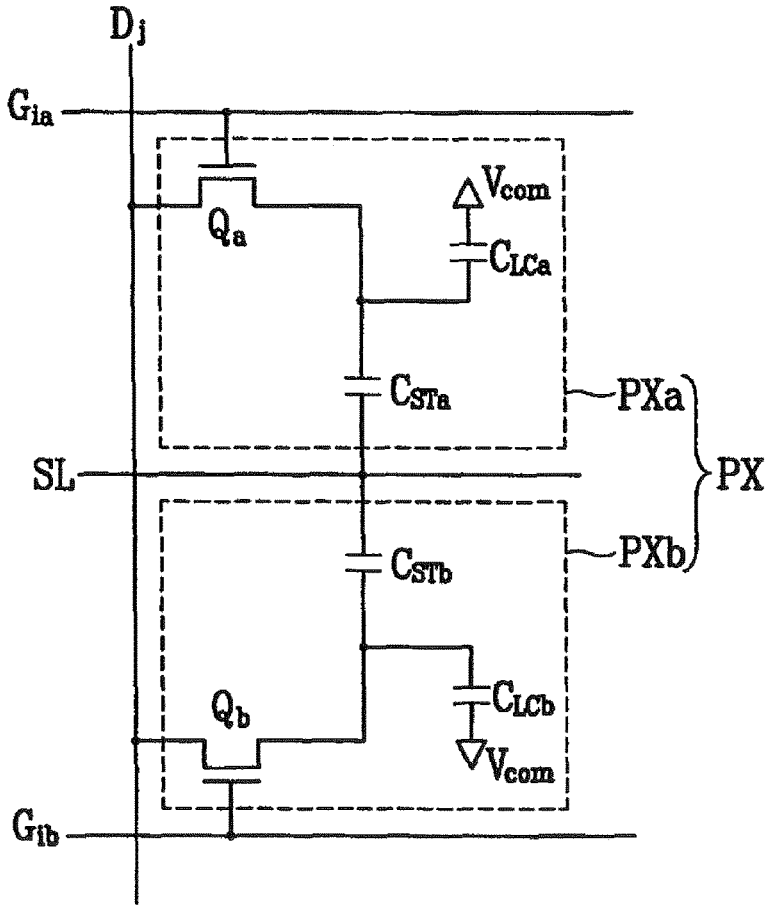
FIG. 15 is an equivalent schematic circuit diagram showing another exemplary embodiment of a pixel of the liquid crystal display apparatus according to the present invention.

FIGS. 14A to 14C are block diagrams of a liquid crystal display apparatus according to other exemplary embodiments of the present invention. FIG. 15 is an equivalent circuit schematic diagram showing another exemplary embodiment of a pixel of the liquid crystal display apparatus according to the present invention. FIG. 16 is a schematic plan view showing another exemplary embodiment of a switching device array and polarity of pixels in the liquid crystal display apparatus according to the present invention.

As shown in FIGS. 14A to 14C, a liquid crystal display apparatus according to other exemplary embodiments of the present invention includes a liquid crystal display panel assembly 300, a pair of gate drivers 400a and 400b or a gate driver 401 and a data driver 500 connected to the liquid crystal display panel assembly 300, a grayscale voltage generator 800 connected to the data driver 500, and a signal controller 600 for controlling the components.

As seen in the equivalent circuit schematic diagram, the liquid crystal display panel assembly 300 includes a plurality of pixels PX connected to a plurality of display signal lines $G_{1a}$ to $G_{nb}$ and $D_1$ to $D_m$ and are arrayed substantially in a matrix.

The display signal lines $G_{1a}$ to $G_{nb}$ and $D_1$ to $D_m$ include a plurality of gate lines $G_{1a}$ to $G_{nb}$ for transmitting gate signals and a plurality of data lines $D_1$ to $D_m$ for transmitting data signals. The gate lines $G_{1a}$ to $G_{nb}$ extend parallel to each other substantially in a row direction, and the data lines $D_1$ to $D_m$ extend parallel to each other substantially in a column direction.

As seen in the equivalent circuit schematic diagram of the display signal lines $G_{ia}$, $G_{ib}$, and $D_j$, the display signal lines further include storage electrode lines SL (only one shown) which extend substantially parallel to the gate lines $G_{ia}$ and $G_{ib}$.

Each pixel PX includes a pair of sub-pixels PXa and PXb. Each sub-pixel PXa/PXb includes a switching device Qa/Qb connected to the respective gate line $G_{ia}/G_{ib}$ and the data line $D_j$, a liquid crystal capacitor $C_{LCa}/C_{LCb}$ connected to the switching device Qa/Qb, and a storage capacitor $C_{STa}/C_{STb}$ connected to the switching device Qa/Qb and the storage line SL. The storage capacitors $C_{STa}$ and $C_{STb}$ may be omitted, as needed. In this case, the storage lines SL are unnecessary.

Since the sub-pixels PXa and PXb are substantially the same as the pixels shown in FIG. 2, detailed description thereof is omitted.

Figure 16:
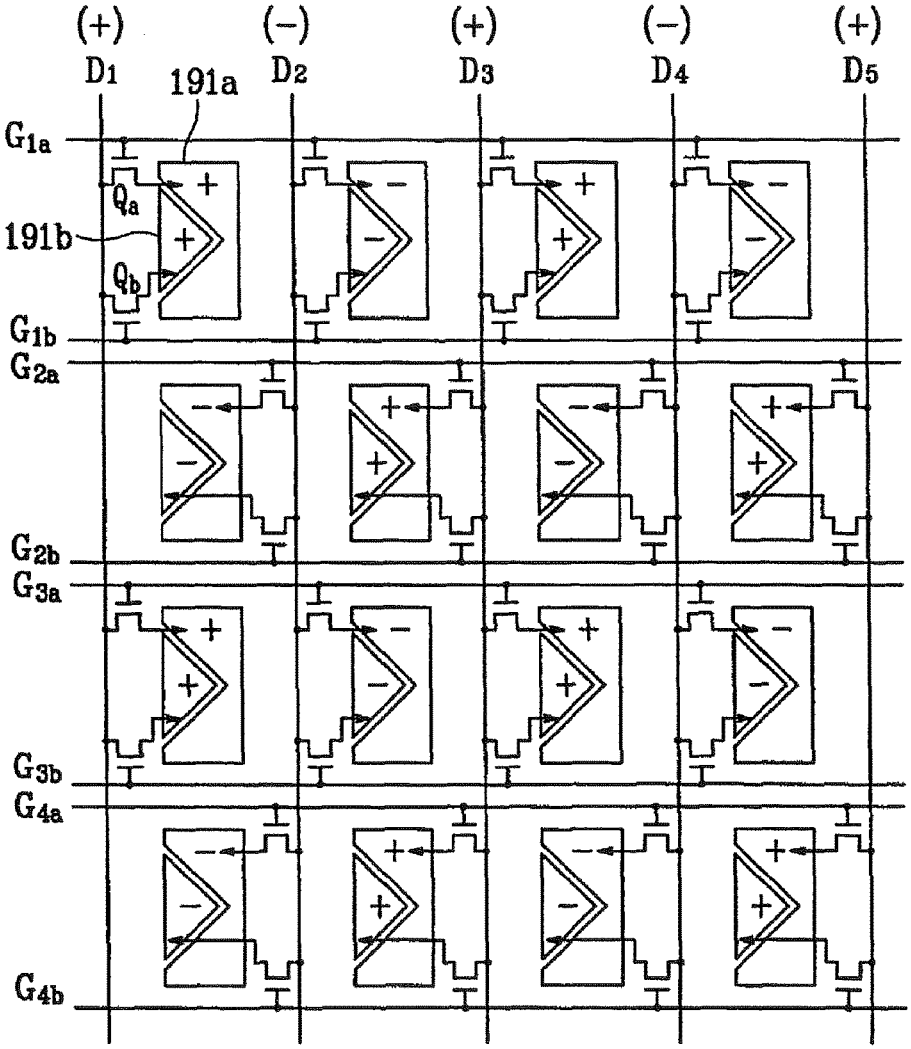
FIG. 16 is a schematic plan view showing an exemplary embodiment of a switching device array and polarity of pixels in the liquid crystal display apparatus according to the present invention.

As shown in FIG. 16, the positions of the switching devices Qa and Qb of the pixels PX in the liquid crystal display apparatus according to the present exemplary embodiment change every pixel row. Namely, in the adjacent rows of pixels, the switching devices Qa and Qb are alternately connected to the data lines of the different sides. Among the four rows of pixels shown in FIG. 16, the switching devices Qa and Qb of the uppermost pixel row and the third pixel row are connected to the left data lines, and the switching devices Qa and Qb of the second pixel row and the fourth pixel row are connected to the right data lines. Therefore, the driver inversion becomes column inversion, but the apparent inversion becomes 1×1 dot inversion. Accordingly, it is possible to eliminate transverse line flicker. In addition, it is possible to increase a charging rate of pixels.

Referring to FIGS. 14A to 14C, the gate drivers 400a, 400b, and 401 are connected to the gate lines $G_{1a}$ to $G_{nb}$ to apply gate signals (formed in a combination of a gate-on voltage $V_{on}$ and a gate-off voltage $V_{off}$ externally supplied) to the gate lines $G_{1a}$ to $G_{nb}$. In FIG. 14A, a pair of the gate drivers 400a and 400b are disposed at the left and right sides of the liquid crystal display assembly 300 and connected to the odd-numbered and even-numbered gate lines $G_{1a}$ to $G_{nb}$, respectively. The gate driver 401 shown in FIGS. 14B and 14C is disposed at one side of the liquid crystal display assembly 300 and is connected to all the gate lines $G_{1a}$ to $G_{nb}$. In the case shown in FIG. 14C, two driver circuits 401a and 401b included in the gate driver 401 are connected to the odd-numbered and even-numbered gate lines $G_{1a}$ to $G_{nb}$, respectively.

The grayscale voltage generator 800 generates two grayscale voltage sets (or reference grayscale voltage sets) associated with transmittance of pixels. The two grayscale voltage sets are independently applied to the two sub-pixels of one pixel. Each grayscale voltage set includes one having a positive value with reference to the common voltage $V_{com}$ and the other having a negative value with reference to the common voltage $V_{com}$. However, instead of two (reference) grayscale voltage sets, one (reference) grayscale voltage set may be generated.

The data driver 500 is connected to the data lines $D_1$ to $D_m$ of the liquid crystal display assembly 300 to select one of the two grayscale voltage sets from the grayscale voltage generator 800 and apply one grayscale voltage of the selected grayscale voltage set to the pixel as a data voltage. However, in a case where the grayscale voltage generator 800 does not provide all the grayscale voltages but only the reference grayscale voltage, the data driver 500 divides the reference grayscale voltage to generate the grayscale voltages or all the grayscales and selects the data voltage from the grayscale voltages.

Now, display operations of the liquid crystal display apparatus will be described in detail.

The signal controller 600 receives input image signals R, G, and B and input control signals that are externally applied and generates a gate control signal CONT1, a data control signal CONT2 and processed image data DAT. After that, the signal controller 600 transmits the generated control signals and image data to the gate drivers 400a, 400b, and 401, and the data driver 500.

In response to the data control signal CONT2 from the signal controller 600, the data driver 500 receives the image data DAT for a pair of the sub-pixels PXa and PXb, selects one of the two grayscale voltage sets from the grayscale voltage generator 800, and selects a gray voltage corresponding to the image data DAT from the selected grayscale voltage set, so that the image data DAT is converted into the associated data voltage. After that, the data voltage is applied to the associated data lines $D_1$ to $D_m$.

Alternatively, instead of the data driver 500, a separately provided external selection circuit (not shown) may select one of the two grayscale voltage sets and transmit the selected one to the data driver 500. Otherwise, the grayscale voltage generator 800 may provide a reference voltage having a variable value, and the date driver 500 may divide the reference voltage, so that the grayscale voltage can be generated.

In response to the gate control signal CONT1 from the signal controller 600, the gate drivers 400a, 400b and 401 apply the gate-on voltage $V_{on}$ to the gate lines $G_{1a}$ to $G_{nb}$ to turn on the switching devices Qa and Qb connected to the gate lines $G_{1a}$ to $G_{nb}$. As a result, the data voltages applied to the data lines $D_1$ to $D_m$ are applied to the associated sub-pixels PXa and PXb through the turned-on switching devices Qa and Qb.

The two above-described grayscale voltage sets represent different gamma curves and are applied to the two sub-pixels PXa and PXb of one pixel PX, so that the gamma curve of the one pixel PX is a composite curve of the gamma curves. In the determination of the two grayscale voltage sets, the composite gamma curve is determined to be close to the reference gamma curve for the front surface. For example, the composite gamma curve for the front surface is determined to be equal to the reference gamma curve for the front surface which is most suitable, and the composite gamma curve for the side surface is determined to be closest to the reference gamma curve for the front surface. By doing so, it is possible to further improve side or lateral visibility.

In units of half a horizontal period (or ½ H), the data driver 500 and the gate drivers 400a, 400b and 401 repeatedly perform the aforementioned operations. In this manner, during one frame, the gate-on voltage $V_{on}$ is sequentially applied to all of the gate lines $G_{1a}$ to $G_{nb}$, so that the data voltages are applied to all the pixels. When one frame ends, the next frame starts, and a state of the reverse signal RVS applied to the data driver 500 is controlled so that the polarity of the data signal applied to each of the pixels is opposite to the polarity in the previous frame. In addition, as described above, the polarities of the data voltages applied to the adjacent data lines $D_1$ to $D_m$ in one frame are inverted, so that the driver inversion becomes column inversion, but the apparent inversion becomes 1×1 dot inversion.

Now, an example of the liquid crystal display apparatus will be described in detail with reference to FIGS. 17 to 19.

Figure 17:
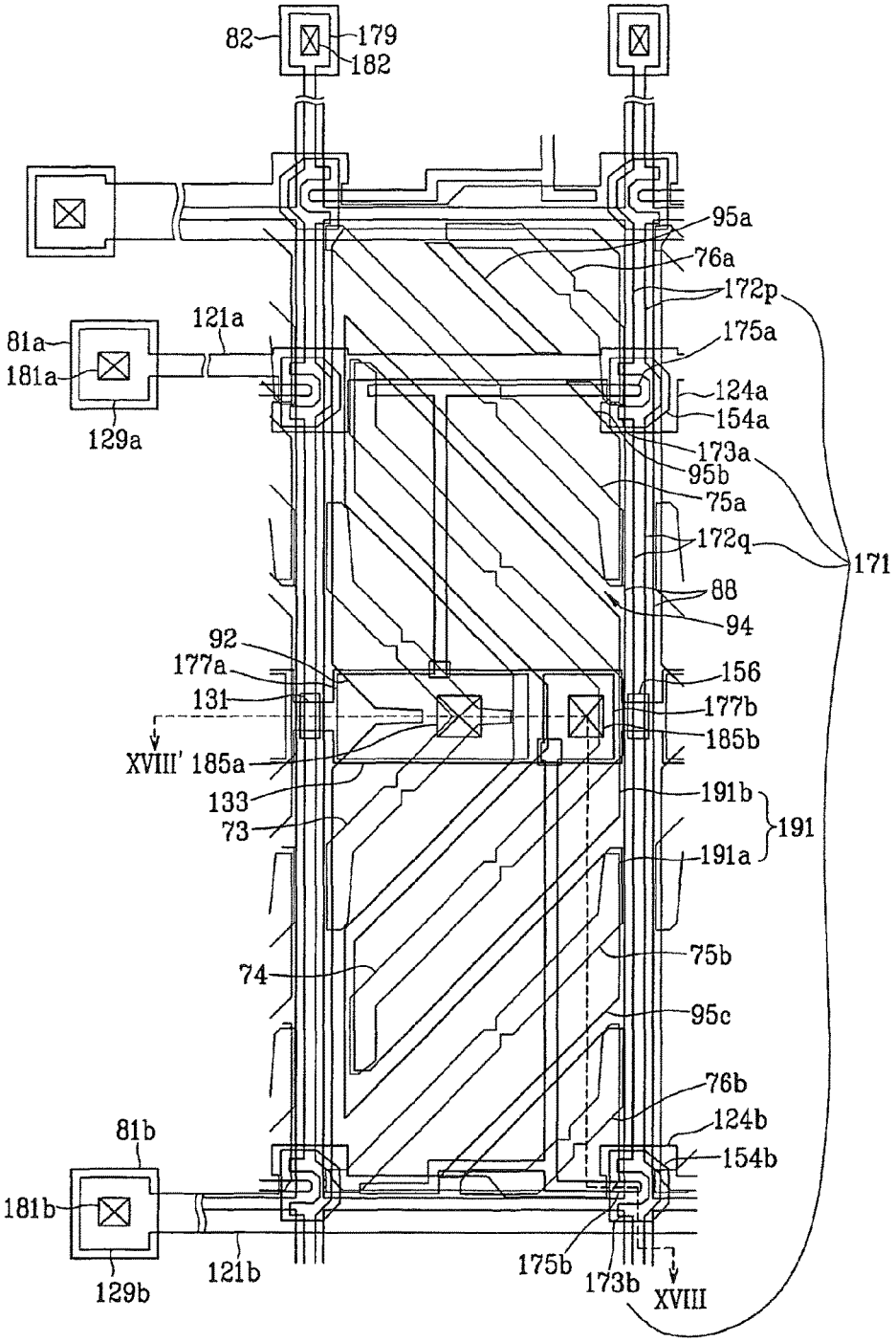
FIG. 17 is a plan view showing a layout of another exemplary embodiment of a liquid crystal display apparatus according to the present invention.

FIG. 17 is a plan view showing a layout of another exemplary embodiment of a liquid crystal display apparatus according to the present invention. FIG. 18 is a cross-sectional view showing the liquid crystal display apparatus taken along line XVIII-XVIII' of FIG. 17. FIG. 19 is a plan view showing a layout of some layers of the liquid crystal display apparatus of FIG. 17.

Figure 18:
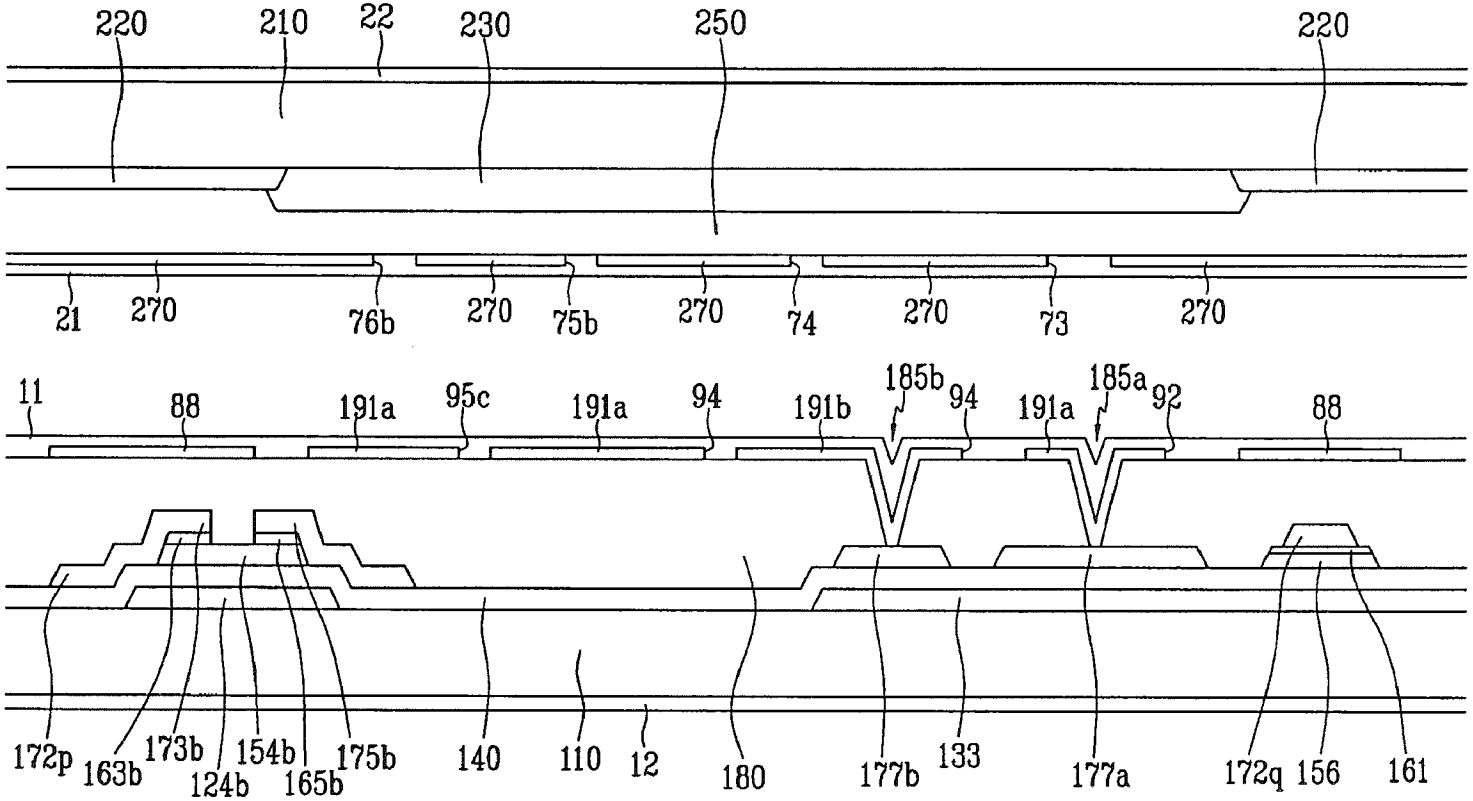
FIG. 18 is a cross-sectional view showing the liquid crystal display apparatus taken along line XVIII-XVIII' of FIG. 17.
Figure 19:
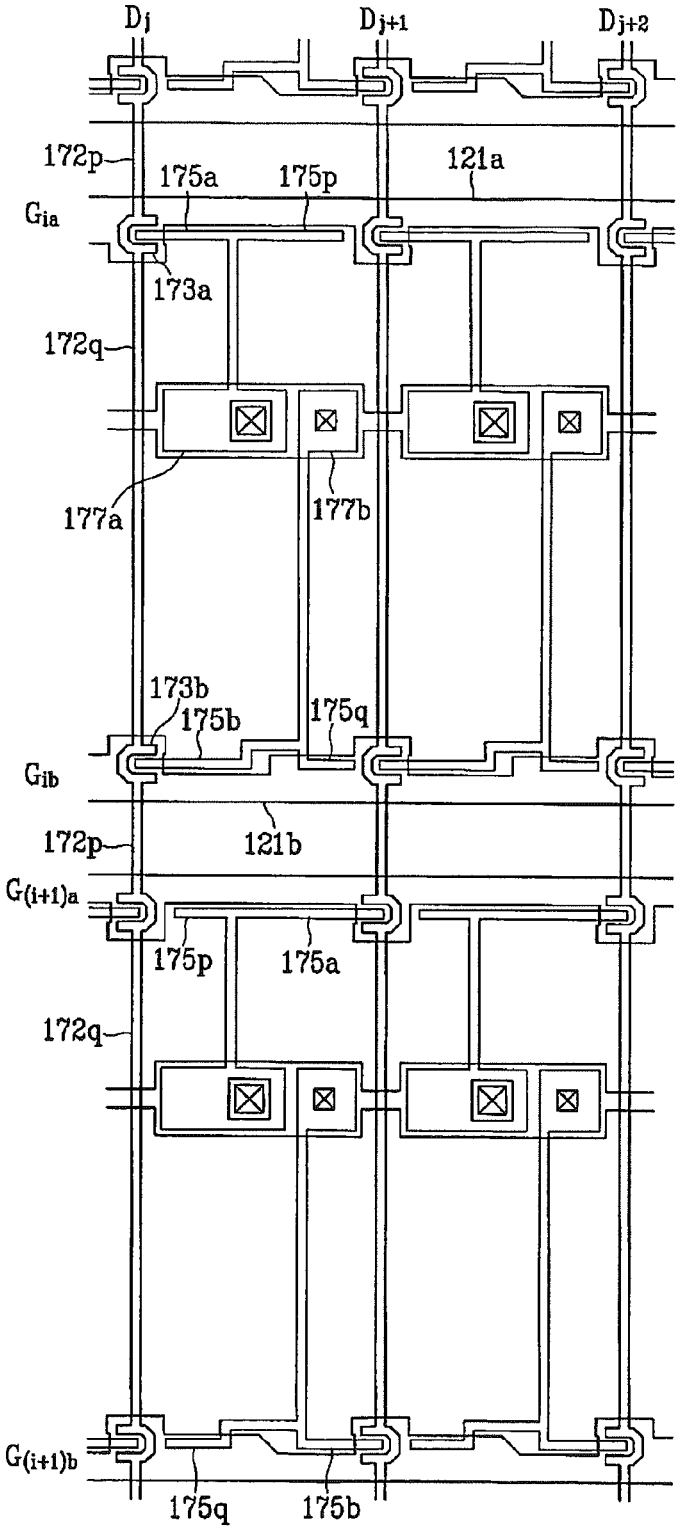
FIG. 19 is a plan view showing a layout of some layers of the liquid crystal display apparatus of FIG. 17.

As shown in FIGS. 17 to 19, since a layered structure of the liquid crystal display apparatus according to the present exemplary embodiment is substantially the same as the layered structure of the liquid crystal display apparatus shown in FIGS. 11 to 13, description of the same components is omitted, and only the different components are described.

First, in the thin film transistor panel 100, a plurality of gate lines 121a and 121b and a plurality of storage electrode lines 131 including a plurality of storage electrodes 133 are formed on a dielectric substrate 110.

The first and second gate lines 121a and 121b are disposed in upper and lower sides, respectively, and include end portions 129a and 129b, respectively, having a wide area for connection to a plurality of first and second gate electrodes 124a and 124b, respectively, protruding in up and down directions, other layers, or external driving circuits.

A gate insulating film 140, a plurality of island-shaped semiconductors 154a, 154b, and 156, and a plurality of island-shaped ohmic contact members 163b and 165b are sequentially formed on the gate lines 121a and 121b and the storage electrode lines 131.

A plurality of data lines 171 and a plurality of pairs of the first and second drain electrodes 175a and 175b are formed on the ohmic contact members 163a, 163b, 165a, and 165b and the gate insulating film 140.

The data lines 171 include a plurality of pairs of first and second straight line portions 172p and 172q, and a plurality of pairs of first and second curved portions 173a and 173b, and end portions 179 having enlarged widths.

The first and second straight line portions 172p and 172q are alternately disposed along one straight line, and the second straight line portion 172q is longer than the first straight line portion 172p and intersects the storage electrode lines 131. The first and second curved portions 173a and 173b are alternately connected between the first and second straight line portions 172p and 172q and are disposed on the semiconductors 154a and 154b.

The first and second drain electrodes 175a and 175b have enlarged portions 177a and 177b having a large area which extend from bar-shaped end portions on the semiconductors 154a and 154b and overlap the storage electrodes 133, as best seen in FIG. 19. The first and second curved portions 173a and 173b constituting source electrodes surround the bar-shaped end portions of the first and second drain electrodes 175a and 175b. The first/second gate electrode 124a/124b, the first/second source electrode 173a/173b, and the first/second drain electrode 175a/175b together with the semiconductor 154a/154b constitute a thin film transistor Qa/Qb. The channel of the thin film transistor Qa/Qb is formed in the semiconductor 154a/154b between the first/second source electrode 173a/173b and the first/second drain electrode 175a/175b.

A protective film 180 is formed on the data lines 171, the drain electrodes 175a and 175b, and exposed portions of the semiconductors 154a and 154b. In the protective film 180, a plurality of contact holes 182, 185a, and 185b which expose the end portions 179 of the data lines 171 and the enlarged portions 177a and 177b of the drain electrodes 175a and 175b are formed. A plurality of contact holes 181 are formed in the protective film 180 and the gate insulating film 140, the plurality of contact holes 181 expose the end portions 129 of the gate lines 121.

A plurality of the pixel electrodes 191 including the first and second sub-pixel electrodes 191a and 191b, the shielding electrodes 88, and a plurality of the contact assistant members 81 and 82 are formed on the protective film 180.

The first/second sub-pixel electrode 191a/191b is physically and electrically connected through the contact hole 185a/185b to the first/second drain electrode 175a/175b, so that the first/second sub-pixel electrode 191a/191b is applied with a data voltage from the first/second drain electrode 175a/175b. Different data voltages that are predetermined for one input image signal are applied to a pair of the sub-pixel electrodes 191a and 191b, and the intensities thereof may be determined according to the sizes and shapes of the sub-pixel electrodes 191a and 191b. In addition, the areas of the sub-pixel electrodes 191a and 191b may be different from each other. As an example, the second sub-pixel electrode 191b may be applied with a higher voltage than the first sub-pixel electrode 191a, and the area of the second sub-pixel electrode 191b may be smaller than that of the first sub-pixel electrode 191a.

The upper right corner of each pixel electrode 191 is cut, and the cut side has an angle of about 45° with respect to the gate lines 121a and 121b.

A pair of first and second sub-pixel electrodes 191a and 191b constituting one pixel electrode 191 is engaged with each other with the gap 94 interposed therebetween, and an outer boundary of the pixel electrode 191 is substantially rectangularly shaped. The second sub-pixel electrode 191b has a shape of a rotated equilateral trapezoid of which a base side is recessed in a shape of a trapezoid, and most of second sub-pixel electrode 191b is surrounded by the first sub-pixel electrode 191a. The first sub-pixel electrode 191a is constructed with upper, lower, and central trapezoidal portions, which are connected to each other at the left side. The first sub-pixel electrode 191a has cut portions 95a, 95b and 95c, which extend from the upper side of the upper trapezoidal portion and the lower side of the lower trapezoidal portion toward the right side. The gate line 121a is disposed between the cut portions 95a and 95b. The central trapezoidal portion of the first sub-pixel electrode 191a is engaged with the recessed base side of the second sub-pixel electrode 191b. The first sub-pixel electrode 191a has a cut portion 92, which extends along the storage electrode line 131. The cut portion 92 has an inlet at the left side of the first sub-pixel electrode 191a and a transverse portion which extends from the inlet in the transverse direction. The inlet of the cut portion 92 has a pair of slanted or angled sides having an angle of about 45° with respect to the storage electrode line 131. In addition, the gap 94 between the first and second sub-pixel electrodes 191a and 191b includes upper and lower slanted or angled portions having a substantially uniform width and an angle of about 45° with respect to the gate lines 121a and 121b and three longitudinal portions having a substantially uniform width. Hereinafter, for the convenience of description, the gap 94 is denoted as a cut portion.

The pixel electrode 191 has the cut portions 92, 94, 95a, and 95b, and the pixel electrode 191 is divided into a plurality of domains by the cut portions 92, 94, 95a, and 95b. The cut portions 92, 94, 95a, and 95b extend substantially from the left side of the pixel electrode 191 to the right side thereof in a slanted or angled direction and have approximate inversion symmetry with respect to the storage electrode line 131. The cut portions 92, 94, 95a, and 95b have an angle of about 45° with respect to the gate lines 121a and 121b to extend perpendicular to each other.

An alignment film 11 is coated on the pixel electrodes 191, the shielding electrodes 88, the contact assistant members 81 and 82, and the protective film 180.

In the common electrode panel 200, shielding members 220, a plurality of color filters 230, a cover film 250, a common electrode 270 having a plurality of cut portions 73, 74, 75a, 75b, 76a, and 76b, and an alignment film 21 are formed on a dielectric substrate 210.

The cut portions 73 to 76b of a common electrode 270 include the central cut portions 73 and 74 which are located across the lower and upper half regions of the pixel electrode 191, the cut portions 75a and 76a which are located in the lower half region, and the cut portions 75b and 76b which are located in the lower half region.

The aforementioned features of the liquid crystal display apparatus of FIGS. 11 to 12 may be applied to the liquid crystal display apparatus of FIGS. 17 and 18.

In FIG. 19, the thin film transistor panel 100 including the four pixels shown in FIG. 17 is schematically shown. In order to clarify the features of the present invention, a gate metal layer, a data metal layer, and the like are shown, and the pixel electrodes are not shown.

As shown in FIG. 19, for example, in the i-th pixel row, the thin film transistors Qa and Qb are located at the left side of the pixels. The inlets of the curved portions 173a and 173b of the data line 171 are oriented to the right side. The drain electrodes 175a and 175b extend from the inlets of the curved portions in the longitudinal and transverse directions and have enlarged portions 177a and 177b. In addition, the drain electrodes 175a and 175b have extension portions 175p and 175q which extend from the longitudinal portions connected to the enlarged portions 177a and 177b to the curved portions 173a and 173b of the adjacent data line 171.

On the contrary, in the (i+1)-th pixel row, the thin film transistors Qa and Qb are located at the right side of the pixels. The inlets of the curved portions 173a and 173b of the data line 171 are oriented to the left side. However, similar to the i-th pixel row, the drain electrodes 175a and 175b have extension portions 175p and 175q which extend from the longitudinal portions connected to the enlarged portions 177a and 177b to the curved portions 173a and 173b of the adjacent data line 171.

Now, another exemplary embodiment of a liquid crystal display apparatus according to the present invention will be described in detail with reference to FIGS. 20 to 22.

Figure 20:
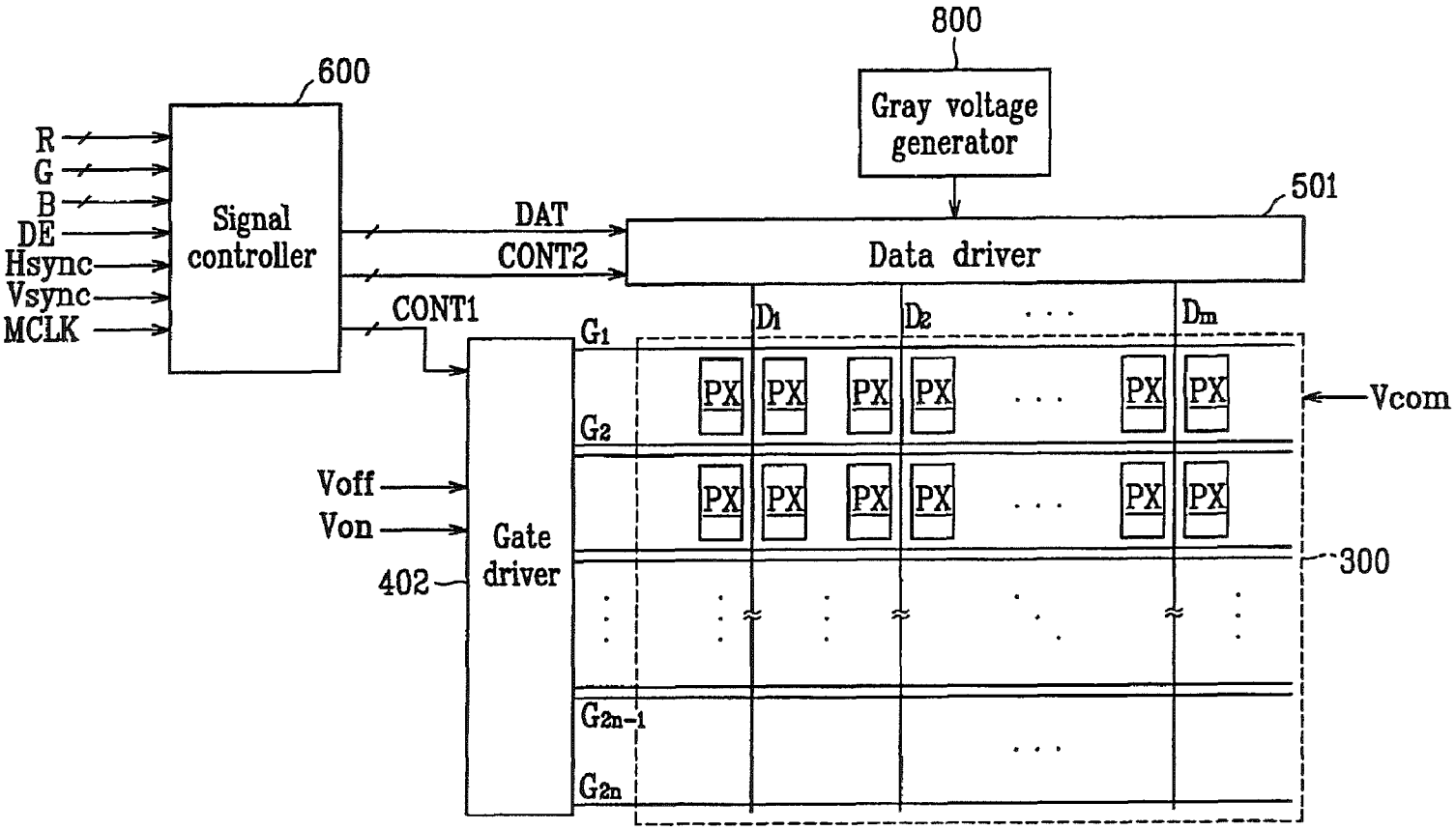
FIG. 20 is a block diagram showing another exemplary embodiment of a liquid crystal display apparatus according to the present invention.

FIG. 20 is a block diagram showing another exemplary embodiment of a liquid crystal display apparatus according to the present invention. FIGS. 21 and 22 are plan views showing other exemplary embodiments of a pixel array of a liquid crystal display apparatus according to the present invention.

As shown in FIG. 20, the liquid crystal display apparatus according to the present exemplary embodiment of the present invention includes a liquid crystal display panel assembly 300, a gate driver 402 and a data driver 501 connected to the liquid crystal display panel assembly 300, a grayscale voltage generator 800 connected to the data driver 501, and a signal controller 600 for controlling the components.

As seen in the equivalent circuit block diagram, the liquid crystal display panel assembly 300 includes a plurality of display signal lines $G_1$ to $G_{2n}$ and $D_1$ to $D_m$, and a plurality of pixels PX connected thereto and arrayed substantially in a matrix.

The display signal lines $G_1$ to $G_{2n}$ and $D_1$ to $D_m$ include a plurality of gate lines $G_1$ to $G_{2n}$ for transmitting gate signals (sometimes referred to as scan signals) and a plurality of data lines $D_1$ to $D_m$ for transmitting data signals. The gate lines $G_1$ to $G_{2n}$ extend parallel to each other substantially in a row direction, and the data lines $D_1$ to $D_m$ extend parallel to each other substantially in a column direction.

Since the pixels PX are substantially the same as the pixels shown in FIG. 2, detailed description thereof is omitted.

Figure 21:
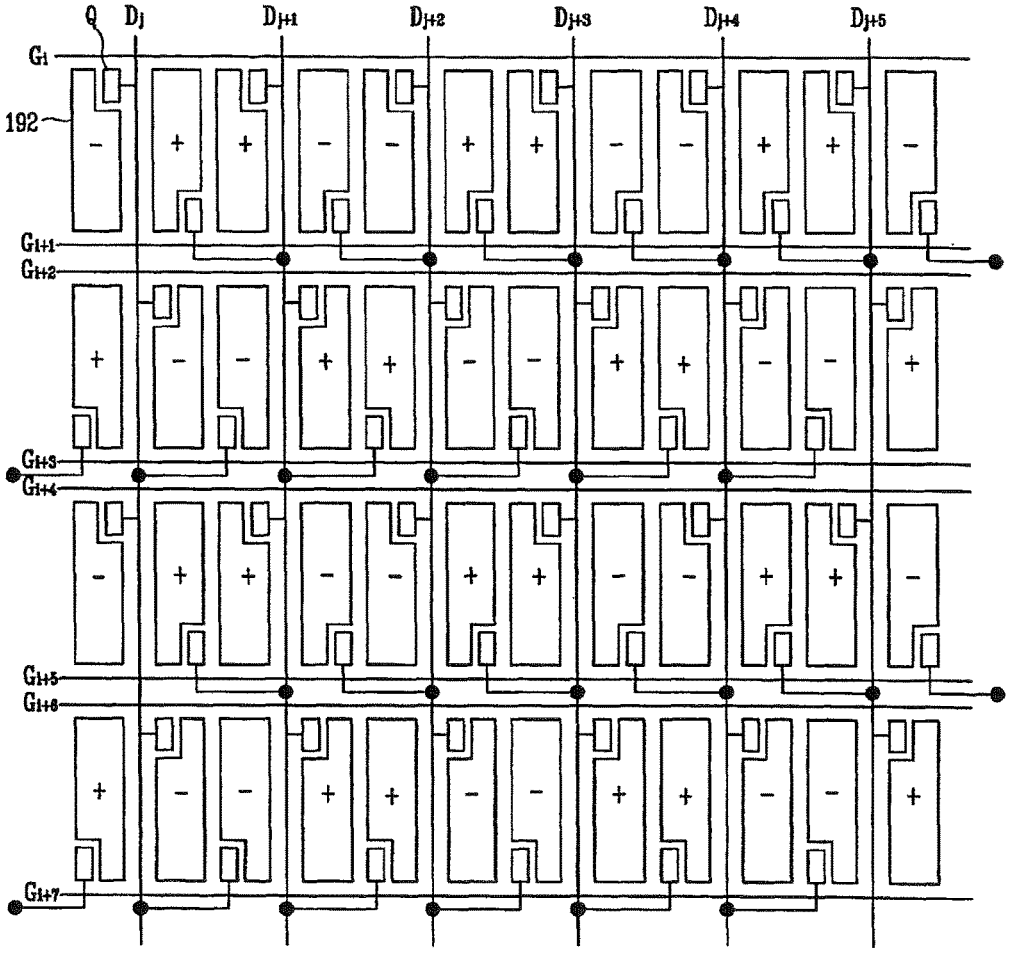
FIGS. 21 and 22 are plan views showing an exemplary embodiment of a pixel array of the liquid crystal display apparatus according to the present invention.

In the pixel array of the liquid crystal display apparatus, as shown in FIG. 21, pairs of gate lines $G_1$ and $G_{i+1}$, $G_{i+2}$ and $G_{i+3}$, . . . (e.g., depicted as $G_1$, $G_2$, $G_3$ and $G_4$ . . . in FIG. 20) are disposed above and below a row of pixel electrodes 192. In addition, each of the data lines $D_1$ to $D_m$ (e.g., depicted as $D_j$, $D_{j+1}$, $D_{j+2}$, $D_{j+3}$ . . . in FIG. 21) is disposed between the pixel electrodes 192 in two columns. Namely, one data line is disposed between a pair of pixel columns. Now, the connection between the gate lines $G_1$ to $G_{2n}$ and the data lines $D_1$ to $D_m$ and the pixel electrodes 192 will be described in detail.

A plurality of pairs of the gate lines $G_1$ to $G_{2n}$ connected to the pixel electrodes 192 at the upper and lower sides thereof are connected through the switching devices Q disposed on the pixel electrodes 192 at the upper or lower side thereof to the associated pixel electrodes 192.

Namely, in the odd-numbered pixel row, the switching devices Q disposed at the left side of the data lines $D_1$ to $D_m$ are connected to the gate lines $G_1$, $G_5$, $G_9$, . . . disposed on the upper side, and the switching devices Q disposed at the right side of the data lines $D_1$ to $D_m$ are connected to the gate lines $G_2$, $G_6$, $G_{10}$, . . . disposed on the lower side. On the contrary, in the even-numbered pixel row, the connection between the upper gate lines $G_3$, $G_7$, $G_{11}$, . . . , the lower gate lines $G_4$, $G_8$, $G_{12}$, . . . , and the switching device Q is opposite to the connection in the odd-numbered pixel row. Namely, the switching devices Q disposed at the right side of the data lines $D_1$ to $D_m$ are connected to the gate lines $G_3$, $G_7$, $G_{11}$, disposed on the upper side, and the switching devices Q disposed at the left side of the data lines $D_1$ to $D_m$ are connected to the gate lines $G_4$, $G_8$, $G_{12}$, . . . disposed on the lower side.

Among the pixel electrodes 192 of the odd-numbered pixel row, the pixel electrodes 192 disposed at the left side of the data lines $D_1$ to $D_m$ are connected through the switching devices Q to the adjacent data lines $D_1$ to $D_m$, and the pixel electrodes 192 disposed at the right side of the data lines $D_1$ to $D_m$ are connected through the switching devices Q to the next adjacent data lines $D_1$ to $D_m$. Among the pixel electrodes 192 of the even-numbered pixel row, the pixel electrodes 192 disposed at the left side of the data lines $D_1$ to $D_m$ are connected through the switching devices Q to the previous data lines $D_1$ to $D_m$, and the pixel electrodes 192 disposed at the right side of the data lines $D_1$ to $D_m$ are connected through the switching devices Q to the adjacent data lines $D_1$ to $D_m$.

The switching devices Q are formed at positions so as to be easily connected to the data lines $D_1$ to $D_m$, namely, so as to shorten connection lengths as much as possible. Therefore, in the pixel array shown in FIG. 21, the positions of the switching devices Q change every pixel row. Namely, among a pair of the pixels disposed in the odd-numbered pixel row, the switching devices Q are formed in an upper right region of the pixels disposed at the left side of the data lines $D_1$ to $D_m$, and the switching devices Q are formed in a lower right region of the pixels disposed at the right side of the data lines $D_1$ to $D_m$.

On the contrary, the positions of the switching devices Q disposed in the odd-numbered pixel rows are opposite to the positions thereof in the adjacent pixel rows. Namely, among a pair of the pixels disposed in the even-numbered pixel row, the switching devices Q are formed in a lower left region of the pixels disposed at the left side of the data lines $D_1$ to $D_m$, and the switching devices Q are formed in a upper left region of the pixels disposed at the right side of the data lines $D_1$ to $D_m$.

In summary of the connection between the pixel electrodes 192 and the data lines $D_1$ to $D_m$ shown in FIG. 21, in each pixel row, the switching devices Q of the two pixels disposed between the adjacent two data lines are connected to the same data lines. Namely, the switching devices Q of the two pixels disposed between the two data lines in the odd-numbered pixel row are connected to the data lines disposed at the right side, and the switching devices Q of the two pixels disposed between the two data lines in the even-numbered pixel row are connected to the data lines disposed at the left side.

Figure 22:
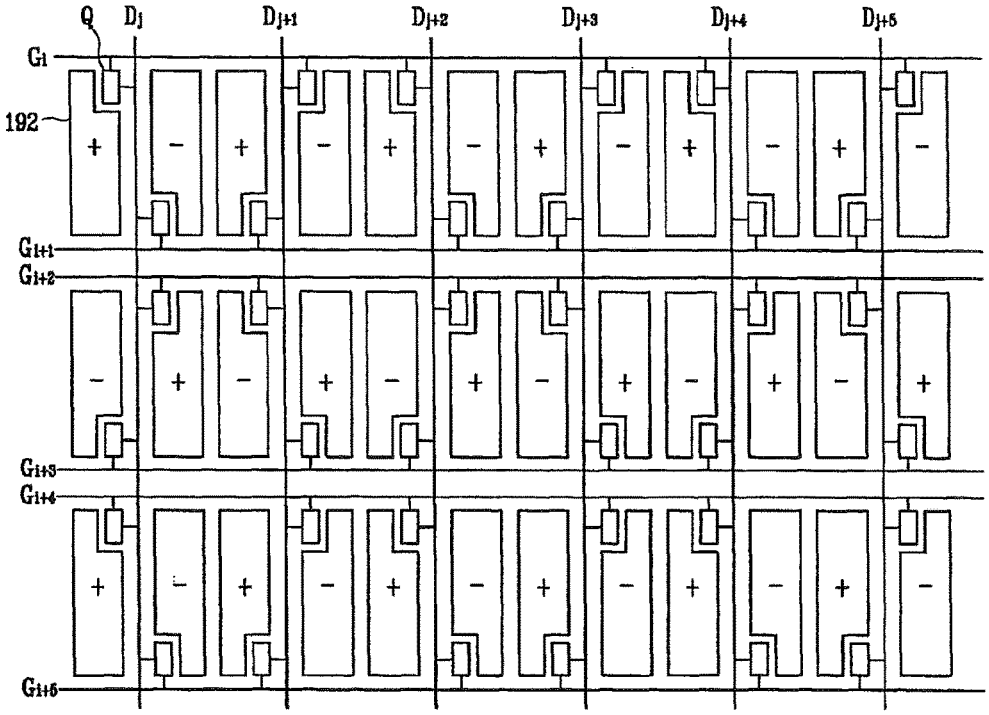

Next, similar to FIG. 21, as shown in FIG. 22, pairs of gate lines $G_i$ and $G_{i+1}$, $G_{i+2}$ and $G_{i+3}$, . . . (e.g., depicted as $G_1$, $G_2$, $G_3$ and $G_4$ . . . in FIG. 20) are disposed above and below a row of pixel electrodes 192. In addition, each of the data lines $D_1$ to $D_m$ (e.g., depicted as $D_j$, $D_{j+1}$, $D_{j+2}$, $D_{j+3}$ . . . in FIG. 22) is disposed between the pixel electrodes 192 in two columns. Namely, one data line is disposed between a pair of pixel columns.

In the connection between the pixel electrodes 192 shown in FIG. 22 with the gate lines $G_1$ to $G_{2n}$, and the data lines $D_1$ to $D_m$, the data lines $D_1$ to $D_m$ are connected to the switching devices Q of the pixels disposed in the two pixel columns. One of the switching devices Q of the two pixels disposed at left and right sides of the data lines $D_1$ to $D_m$ is connected to the gate line disposed at the upper side, and the other is connected to the gate line disposed at the lower side. In addition, the switching devices disposed between the two adjacent data lines are connected to the gate lines at the same side. The pixel structure of one pixel row and the pixel structure of the adjacent pixel row have symmetry with respect to the gate lines.

The positions of the switching devices Q disposed on the pixels change every pixel row. Namely, on the pixels disposed in the odd-numbered pixel row, the switching devices Q are sequentially formed on upper right, lower left, lower right, and upper left regions thereof, and on the pixels disposed in the even-numbered pixel row, the switching devices Q are sequentially formed on lower right, upper left, upper right, and lower left regions thereof.

The arrays shown in FIGS. 21 and 22 are merely an example, and the connection between the pixel electrodes 192, the data lines $D_1$ to $D_m$, and the gate lines $G_1$ to $G_{2n}$ may change among them, and other connections may be employed.

Returning to FIG. 20, the grayscale voltage generator 800 generates two grayscale voltage sets associated with transmittance of pixels. One of the two sets has a positive value with respect to the common voltage $V_{com}$, and the other set has a negative value.

The gate driver 402 is connected to the gate lines $G_1$ to $G_{2n}$ of the liquid crystal display panel assembly 300 to apply gate signals (formed in a combination of a gate-on voltage $V_{on}$ and a gate-off voltage $V_{off}$ that are externally supplied) to the gate lines $G_1$ to $G_{2n}$.

The data driver 501 is connected to the data lines $D_1$ to $D_m$ of the liquid crystal display panel assembly 300 to select grayscale voltages from the grayscale voltage generator 800 and apply the selected grayscale voltages to the pixels as data signals.

The signal controller 600 controls operations of the gate driver 402, the data driver 501, and the like.

Now, display operations of the liquid crystal display apparatus according to the present exemplary embodiment will be described in detail.

The signal controller 600 receives input image signals R, G, and B and input control signals that are externally applied and transmits a gate control signal CONT1, a data control signal CONT2, and processed image data DAT to the gate driver 402 and the data driver 501. Here, the processing for the image signals R, G and B includes operations for re-arranging the image data R, G and B according to the pixel array of the liquid crystal display panel assembly 300 shown in FIGS. 21 and 22.

In response to the data control signal CONT2, the data driver 501 sequentially receives the image data DAT for half the pixels of one pixel row and selects a gray voltage corresponding to the image data DAT from the selected grayscale voltages from the grayscale voltage generator 800, so that the image data DAT is converted into the associated data voltage. After that, the data voltage is applied to the associated data lines $D_1$ to $D_m$.

In response to the gate control signal CONT1 from the signal controller 600, the gate driver 402 applies the gate-on voltage $V_{on}$ to the gate lines $G_1$ to $G_{2n}$ to turn on the switching devices Q connected to the gate lines $G_1$ to $G_{2n}$. As a result, the data voltages applied to the data lines $D_1$ to $D_m$ are applied to the associated pixels through the turned-on switching devices Q.

In units of half a horizontal period (or ½ H), the data driver 501 and the gate driver 402 repeatedly perform the aforementioned operations. In this manner, during one frame, the gate-on voltage $V_{on}$ is sequentially applied to all of the gate lines $G_1$ to $G_{2n}$, so that the data voltages are applied to all of the pixels. When one frame ends, the next frame starts, and a state of the reverse signal RVS applied to the data driver 501 is controlled, so that the polarity of the data signal applied to each of the pixels is opposite to the polarity in the previous frame (frame inversions).

In addition, as described above, the data driver 501 inverts the polarities of the data voltages applied to the adjacent data lines $D_1$ to $D_m$ in one frame, so that the polarities of the pixel voltages of the pixels applied with the data voltages also change. However, since the connection of the pixels and the data lines $D_1$ to $D_m$ may be formed in various manners as shown in FIGS. 21 and 22, the polarity inversion pattern in the data driver 501 is different from the polarity inversion pattern of the pixel voltages displayed on a screen of the liquid crystal display panel assembly 300. Hereinafter, the inversion in the data driver 501 is referred to as driver inversion, and the inversion displayed on the screen is referred to as apparent inversion.

Now, types of inversion according to another exemplary embodiment of the present invention will be described in detail with reference to FIGS. 21 and 22.

In FIG. 21, the driver inversion is column inversion where the data voltages of the one data line always have the same polarity, and the data voltages of the adjacent two data lines have opposite polarities. The apparent inversion is 1×2 dot inversion.

In FIG. 22, the driver inversion is row and column inversion where the data voltages of one data line always have polarities inverted every row, and the data voltages of the adjacent two data lines have opposite polarities. The apparent inversion is 1×1 dot inversion.

In this manner, if the apparent inversion becomes the dot inversion, the brightness difference (caused by kick-back voltages when the pixel voltage is a positive polarity and when the pixel voltage is a negative polarity) is dispersed, thus making it is possible to reduce transverse line defects.

Now, structures of a thin film transistor display panel 100 and a common electrode panel 200 of the liquid crystal display panel assembly 300 will be described in detail with reference to FIGS. 23 to 27.

Figure 23:
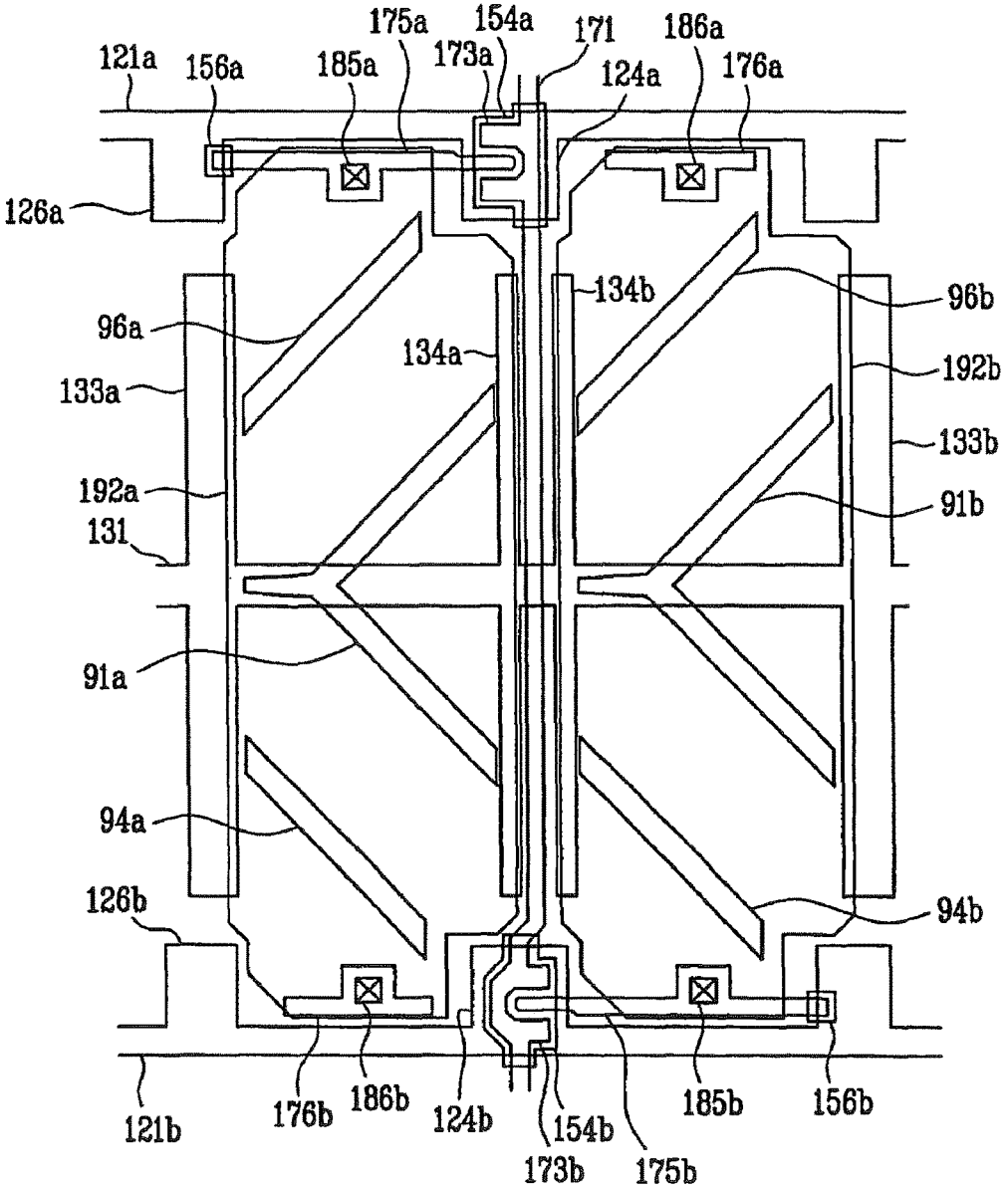
FIG. 23 is a plan view showing a layout of another exemplary embodiment of a thin film transistor display panel of a liquid crystal display panel assembly according to the present invention.
Figure 24:
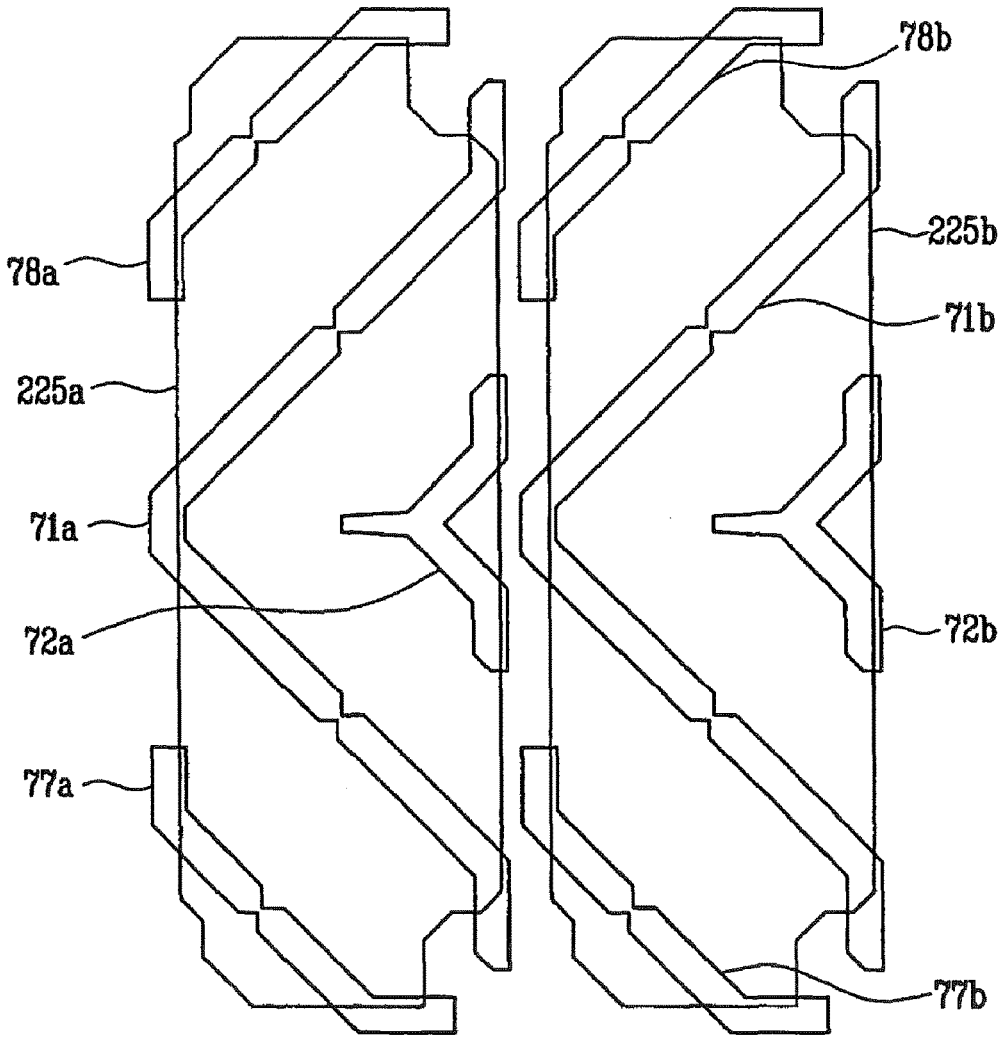
FIG. 24 is a plan view showing a layout of another exemplary embodiment of a common electrode panel of a liquid crystal display panel assembly according to the present invention.
Figure 25:
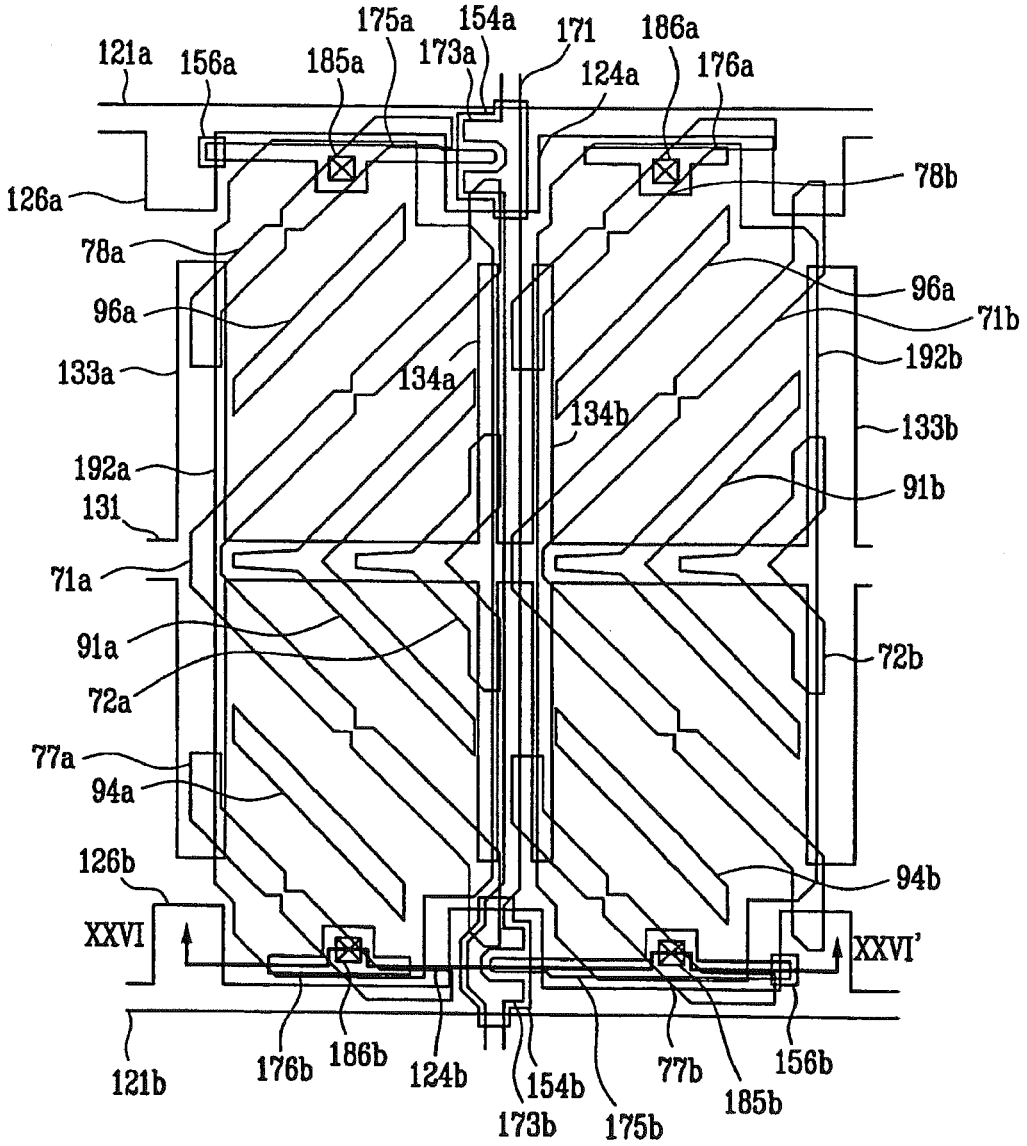
FIG. 25 is a plan view showing a layout of the liquid crystal display panel assembly constructed with the thin film transistor display panel of FIG. 23 and the common electrode panel of FIG. 24.
Figure 26:
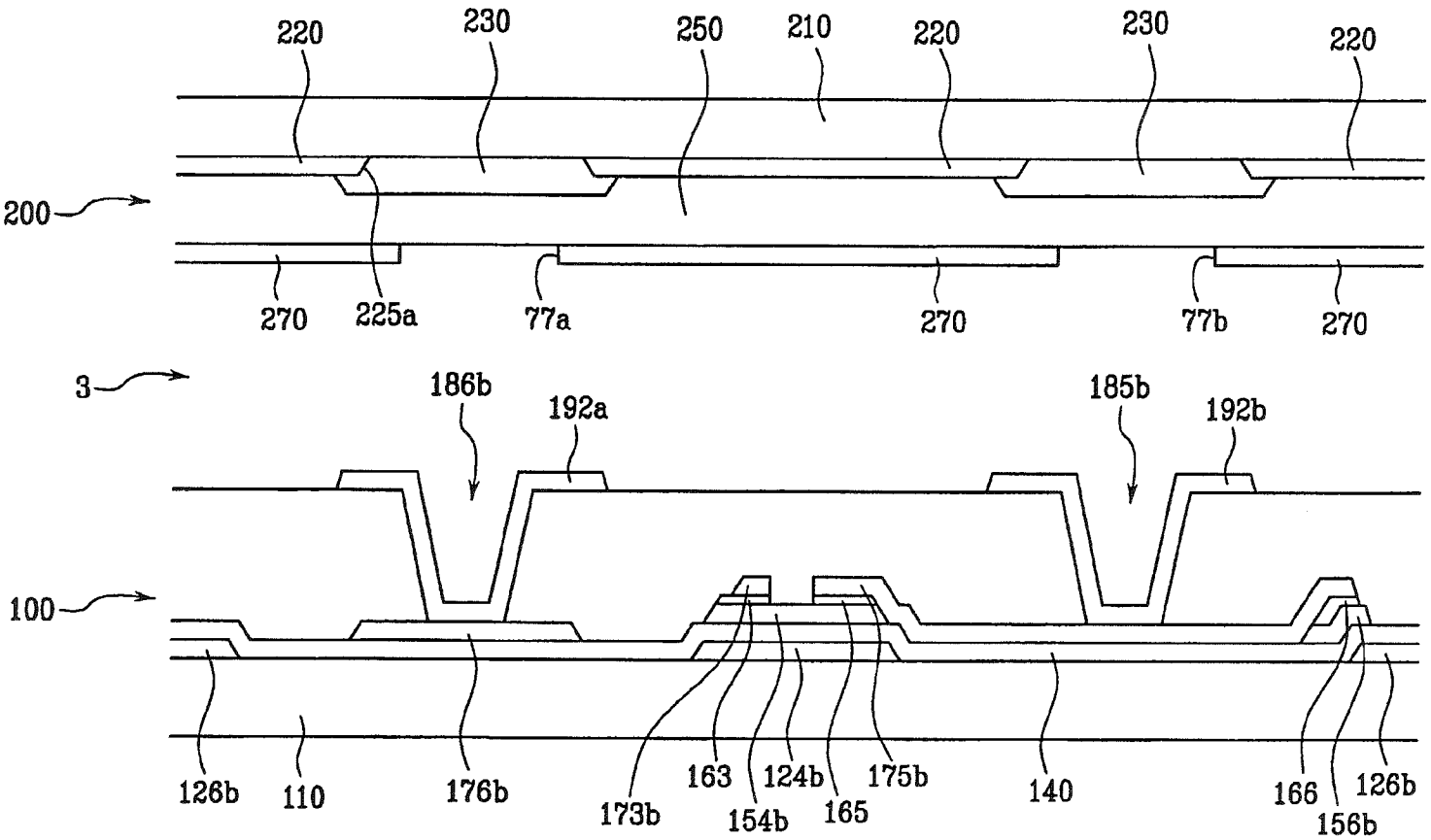
FIG. 26 is a cross-sectional view showing the liquid crystal display apparatus taken along line XXVI-XXVI' of FIG. 25.
Figure 27:
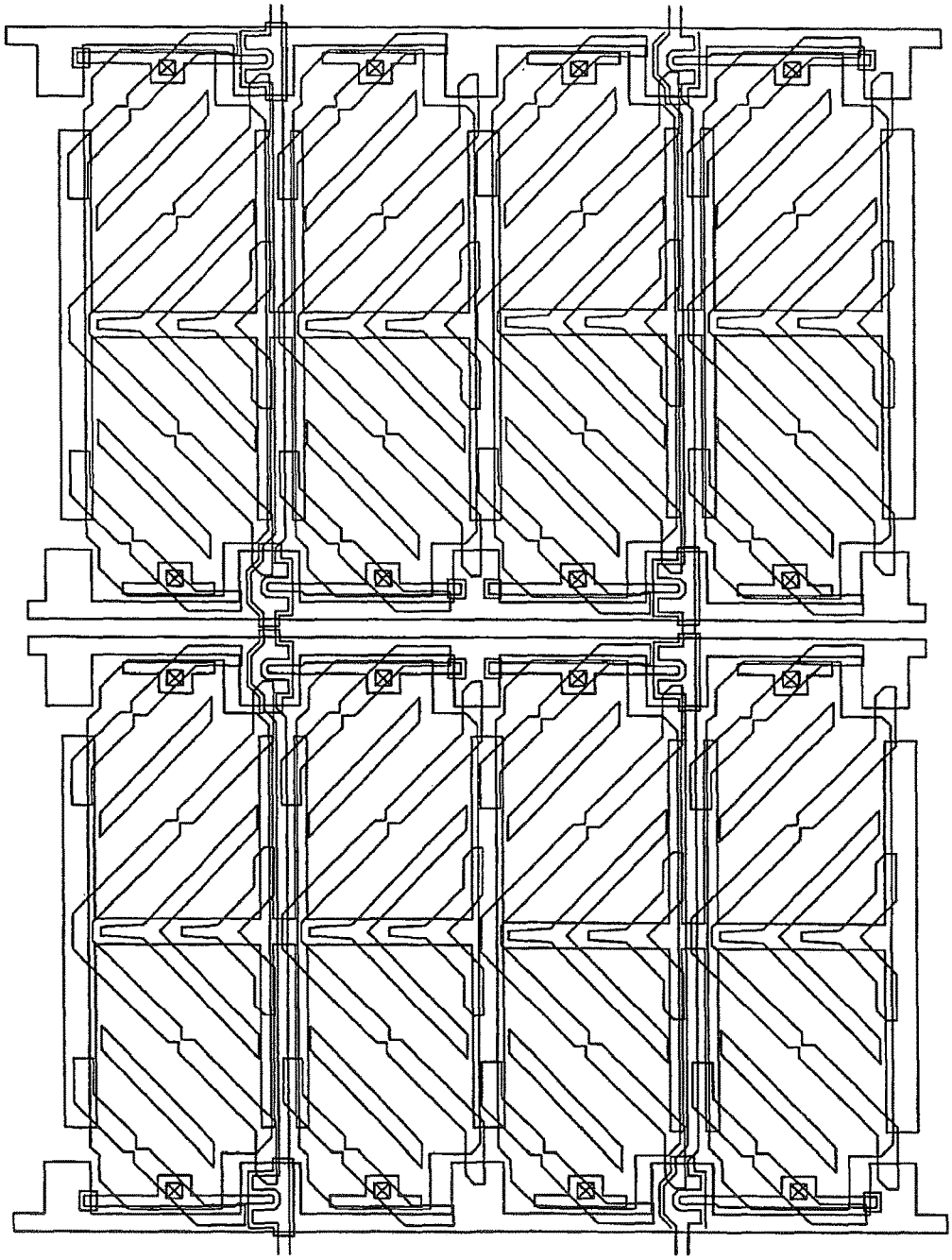
FIG. 27 is a plan view showing a layout of a pixel array of the liquid crystal display panel assembly of FIG. 25.

FIG. 23 is a plan view showing a layout of another exemplary embodiment of a thin film transistor display panel of a liquid crystal display panel assembly according to the present invention. FIG. 24 is a plan view showing a layout of another exemplary embodiment of a common electrode panel of a liquid crystal display panel assembly according to the present invention. FIG. 25 is a plan view showing a layout of the liquid crystal display panel assembly constructed with the thin film transistor display panel of FIG. 23 and the common electrode panel of FIG. 24. FIG. 26 is a cross-sectional view showing the liquid crystal display apparatus taken along line XXVI-XXVI' of FIG. 25. FIG. 27 is a plan view showing a layout of a pixel array of the liquid crystal display panel assembly of FIG. 25.

As shown in FIGS. 23 to 27, since a layered structure of the liquid crystal display apparatus according to the present exemplary embodiment is substantially the same as the layered structure of the liquid crystal display apparatus shown in FIGS. 17 to 19, description of the same components is omitted, but only the different components are described.

First, in the thin film transistor panel 100, a plurality of gate lines 121a and 121b and a plurality of storage electrode lines 131 are formed on a dielectric substrate 110.

The gate lines 121a and 121b extend mainly in a transverse direction. A portion of the gate line 121a protrudes in a downward direction to constitute a gate electrode 124a and a dummy gate electrode 126a. Likewise, a portion of the gate line 121b protrudes in an upward direction to constitute a gate electrode 124b and a dummy gate electrode 126b. The two gate lines 121a and 121b are adjacent to each other to constitute a pair.

The storage electrode lines 131 extend mainly in the transverse direction and include a plurality of pairs of branch groups constructed with first to fourth storage electrodes 133a, 133b, 134a, and 134b.

A gate insulating film 140, a plurality of island-shaped semiconductors 154a, 154b, 156a, and 156b, and a plurality of island-shaped ohmic contact members 163a, 163b, 165a, 165b, and 166 are sequentially formed on the gate lines 121a and 121b and the storage electrode lines 131. The semiconductors 154a and 154b are disposed on the gate electrodes 124a and 124b, respectively, and semiconductors 156a and 156b are disposed on dummy gate electrodes 126a and 126b, respectively. The contact member 163a/163b and the contact member 165a/165b constitute a pair and are disposed on the island-shaped semiconductor 154a/154b.

A plurality of data lines 171 (see FIG. 27), a plurality of drain electrodes 175a and 175b, and a plurality of dummy drain electrodes 176a and 176b are formed on the ohmic contact members 163b, 165b, and 166 and the gate insulating film 140.

The data lines 171 mainly extend in a longitudinal direction to intersect the gate lines 121a and 121b and the storage electrode lines 131. The data lines 171 transmit the data voltages. On the data lines 171, a plurality of branches which extend toward the drain electrodes 175a and 175b in the left and right directions constitute source electrodes 173a and 173b, respectively. The drain electrodes 175a and 175b extend from bar-shaped end portions surrounded by the source electrodes 173a and 173b in the transverse direction. The source electrodes 173a and 173b are formed to be curved so as to surround the straight line portions of the drain electrodes 175a and 175b. The positions of the dummy drain electrodes 176a and 176b in the pixels are substantially the same as the positions of the drain electrodes 175a and 175b in the pixels.

The gate electrode 124a/124b, the source electrode 173a/173b and the drain electrode 175a/175b together with the island-shaped semiconductor 154a/154b constitute a thin film transistor. The channel of the thin film transistor is formed in the island-shaped semiconductor 154a/154b between the source electrode 173a/173b and the drain electrode 175a/175b.

A protective film 180 is formed on the data lines 171, the drain electrodes 175a and 175b, the dummy drain electrodes 176a and 176b, and exposed portions of the semiconductors 154a and 154b.

In the protective film 180, a plurality of contact holes 185a, 185b, 186a, and 186b are formed, which expose the drain electrodes 175a and 175b and the dummy drain electrodes 176a and 176b. The contact holes 186a and 186b are dummy contact holes, which may be omitted.

On the protective film 180, a plurality of the pixel electrodes 192a and 192b are formed. The pixel electrodes 192a and 192b are physically and electrically connected through the contact holes 185a and 185b to the drain electrodes 175a and 175b, respectively, so that the pixel electrodes 192a and 192b are applied with data voltages from the drain electrodes 175a and 175b, respectively.

The outer boundaries of the pixel electrodes 192a and 192b are formed along the gate lines 121a and 121b, the gate electrodes 124a and 124b, the dummy gate electrodes 126a and 126b, and the storage electrodes 133a, 133b, 134a and 134b. The pixel electrodes 192a and 192b include central cut portions 91a and 91b, lower cut portions 94a and 94b, and the upper cut portions 96a and 96b. The pixel electrodes 192a and 192b are divided into a plurality of domains by the cut portions 91a to 96b. The cut portions 91a to 96b have approximate inversion symmetry with respect to the storage electrode lines 131.

The lower and upper cut portions 94a, 94b, 96a and 96b extend substantially from the left sides of the pixel electrodes 192a and 192b to the right sides thereof in a slanted or angled direction. The lower cut portions 94a and 94b and the upper cut portions 96a and 96b are disposed in lower and upper half regions, respectively, of the pixel electrodes 192a and 192b divided by the storage electrode lines 131, and form an angle of about 45° with respect to the gate lines 121a and 121b to extend perpendicular to each other.

The central cut portions 91a and 91b extend from the storage electrode lines 131 to the right side in a slanted or angled direction and include a pair of slanted sides which are substantially parallel to the respective lower cut portions 94a and 94b and the upper cut portions 96a and 96b. The slanted sides also form an angle of about 45° with respect to the gate lines 121a and 121b to extend perpendicular to each other.

Accordingly, each of the upper and lower half regions of the pixel electrode 192a/192b is divided into three domains by the cut portions 91a to 96a/91b to 96b. Here, the number of domains or the number of cut portions may vary according to a size of pixel, an aspect ratio of the pixel electrode 192a/192b, a type or characteristics of the liquid crystal layer 3, or other design factors.

The pixel electrodes 192a and 192b have substantially the same openings. Namely, the dummy gate electrodes 126a and 126b have substantially the same shapes as the gate electrodes 124a and 124b. The positions of the dummy drain electrodes 176a and 176b are the same as the positions of the drain electrodes 175a and 175b. In addition, the cut portions 91a to 96a and 91b to 96b of the pixel electrodes 192a and 192b have substantially the same shapes. In addition, the patterns within the openings of the pixel electrodes 192a and 192b have a substantially up and down symmetry. In this manner, if the shape of the pixel electrodes 192a and 192b and openings thereof are the same, even though the positions of the switching devices of the pixels are different from each other, optical characteristics of all the pixels become equal to each other, thus making it is possible to prevent deterioration of image quality.

Now, the common electrode panel 200 will be described. As best seen with reference to FIGS. 24 and 26, shielding members 220 having a plurality of openings 225a and 225b which face the pixel electrodes 192a and 192b and have substantially the same shape as the pixel electrodes 192a and 192b are formed on a dielectric substrate 210. Alternatively, the shielding member 220 may be formed with portions corresponding to the data lines 171 and portions corresponding to the thin film transistors Q. However, the shielding members 220 may have various shapes in order to prevent light leakage in a vicinity of the pixel electrodes 192a and 192b and the thin film transistors Q.

A plurality of color filters 230, a cover film 250, and a common electrode 270 are sequentially formed on the substrate 210 and the shielding members 220.

The common electrode 270 has a plurality of sets of cut portions 71a, 72a, 77a, 78a, 71b, 72b, 77b, and 78b. Since the cut portions 71b to 78b and the cut portions 71a to 78a have the same shapes, only the cut portions 71a to 78a will be described.

One set of the cut portions 71a to 78a faces one pixel electrode 192a and includes central cut portions 71a and 72a, a lower cut portion 77a, and an upper cut portion 78a. The cut portions 71a to 78a are disposed between the cut portions 91a to 96a of the adjacent pixel electrodes 192a and between edge cut portions 94a and 96a and corners of the pixel electrode 192a (see FIG. 25). In addition, each of the cut portions 71a to 78a has at least one slanted or angled portion which extends parallel to the respective cut portions 91a to 96a of the pixel electrode 192a.

Each of the lower and upper cut portions 72a and 77a includes a slanted or angled portion which extends from the right side of the pixel electrode 192a toward the lower or upper side thereof, and longitudinal and transverse portions which extend from the ends of the slanted or angled portion along the sides of the pixel electrode 192a forming an obtuse angle with respect to the slanted or angled portion and overlap the sides of the pixel electrode 192a.

The central cut portion 71a includes a longitudinal portion which extends along the left side of the pixel electrode 192a and overlaps the left side thereof, a pair of slanted or angled portions which extend from the ends of the longitudinal portion and toward the right side of the pixel electrode 192a, and a distal longitudinal portion which extends from the ends of each of the slanted or angled portions along the right side of the pixel electrode 192a forming an obtuse angle with respect to the slanted or angled portions and overlaps the right side. The central cut portion 72a includes a pair of slanted or angled portions which extend substantially from the storage electrode line 131 and toward the right side of the pixel electrode 192a forming a slanted angle with respect to the storage electrode line 131 and distal end portions which extend from the each of the ends of the slanted or angled portions along the right side of the pixel electrode 192a forming an obtuse angle with respect to the slanted portions and overlap the right side thereof.

Notches having a shape of a "V" or triangle are formed in the slanted or angled portions on opposite sides of the cut portions 71a, 77, and 78a. The notches may have a shape of a rectangle, a trapezoid, or a semicircle, and may have a convex or concave shape. An alignment direction of the liquid crystal molecules located in domain boundaries corresponding to the cut portions 71a, 77, and 78a can be determined due to the notches.

On the other hand, a plurality of the pixels shown in FIG. 27 are obtained by disposing the pixels shown in FIG. 25 in a pixel array of FIG. 22. Here, the shape of the thin film transistors of the four upper and lower pixels and the positions of the gate lines and the data lines are different from each other. The thin film transistors of the four upper pixels are sequentially located at the upper right, lower left, lower right, and upper right regions. Accordingly, the gate electrodes and the drain electrodes are located at the different positions. However, due to the dummy gate electrodes and the dummy drain electrodes, the openings of the pixels are substantially equal to each other. As a result, since optical characteristics of the pixels are equal to each other, it is possible to prevent deterioration in image quality.

The aforementioned features of the liquid crystal display apparatus of FIGS. 14A to 19 may be applied to the liquid crystal display apparatus of FIGS. 20 and 27.

The present invention described in the exemplary embodiments can be applied to a case where pixels having different shapes are disposed within a liquid crystal display panel assembly. Particularly, the present invention can be employed to a structure such as a VA mode LCD where a plurality of domains are formed.

According to the present invention, by alternately disposing thin film transistors at left and right sides of the pixels, driver inversion becomes column inversion, but apparent inversion becomes dot inversion. Accordingly, it is possible to eliminate transverse line flicker and to increase a charging rate of the pixels.

In addition, by providing source electrodes along data lines and extending drain electrodes to the source electrodes of adjacent pixels, it is possible to maintain uniformity of the pixels even though the thin film transistors are alternately disposed at right and left sides of the pixels. In addition, inversion driving schemes according to the present invention can be applied to a PVA mode. As a result, it is possible to obtain a wide viewing angle.

In addition, by dividing one pixel into a pair of sub-pixels and applying different data voltages to the sub-pixels, it is possible to improve side or lateral visibility.

Further, by forming a plurality of dummy gate electrodes and a plurality of dummy drain electrodes, it is possible to prevent deterioration in image quality.

Although exemplary embodiments and modified examples of the present invention have been described, the present invention is not limited to the embodiments and examples, but may be modified in various forms without departing from the scope of the appended claims, the detailed description and the accompanying drawings of the present invention. Therefore, it is natural that such modifications belong to the scope of the present invention.

What is claimed is:

[1. A liquid crystal display apparatus comprising:

a plurality of data lines, each of the plurality of data lines having a plurality of straight line portions and a plurality of curved portions connected to the plurality of straight line portions;

a plurality of gate lines disposed substantially perpendicular to the plurality of data lines;

a plurality of thin film transistors connected to the plurality of data lines and the plurality of gate lines; and a plurality of pixel electrodes respectively connected to the plurality of thin film transistors, wherein the plurality of straight line portions and the plurality of curved portions for each data line of the plurality of data lines are linearly aligned, and wherein each of the plurality of curved portions comprises:

a substantially concave surface; and a substantially convex surface opposing the substantially concave surface, wherein a terminal of the substantially concave surface and a terminal of the substantially convex surface both meet a terminal of the straight line portion adjacent to the curved portion, and wherein both the substantially concave surface and the substantially convex surface are disposed on a first side of two extended edges of the straight line portion adjacent to the curved portion, and wherein a remainder of the curved portion is disposed on a second side of the two extended edges of the straight line portion and includes a first linear branch and a second linear branch disposed substantially opposite the first linear branch defining a space therebetween.]

[2. The liquid crystal display apparatus of claim 1, wherein channels of the thin film transistors are disposed in extension lines of the straight line portions of the data lines.]

[3. The liquid crystal display apparatus of claim 1, wherein the curved portions constitute source electrodes of the thin film transistors.]

[4. The liquid crystal display apparatus of claim 3, further comprising drain electrodes connected to the pixel electrodes, wherein each of the curved portions surrounds an end of a respective drain electrode.]

[5. The liquid crystal display apparatus of claim 4, wherein the drain electrodes are at least one of located substantially at a same position in each pixel and are substantially symmetrically disposed in a pixel array matrix.]

[6. The liquid crystal display apparatus of claim 1, wherein the curved portions are U-shaped.]

[7. The liquid crystal display apparatus of claim 1, wherein the curved portions have inlets which open in opposite directions every pixel row.]

[8. The liquid crystal display apparatus of claim 1, further comprising shielding electrodes which cover the straight line portions of the data lines and at least partially overlap the curved portions of the data lines.]

[9. The liquid crystal display apparatus of claim 1, wherein the thin film transistors of different pixel rows are connected to the data lines of different sides.]

[10. The liquid crystal display apparatus of claim 1, wherein polarities of data voltages of adjacent data lines are opposite to each other.]

[11. The liquid crystal display apparatus of claim 1, wherein polarities of data voltages of adjacent data lines are the same.]

[12. The liquid crystal display apparatus of claim 1, wherein each of the pixel electrodes has at least one cut portion.]

[13. The liquid crystal display apparatus of claim 1, wherein each of the pixel electrodes includes a first sub-pixel electrode connected to the drain electrode and a second sub-pixel electrode capacitively-coupled with the first sub-pixel electrode.]

[14. The liquid crystal display apparatus of claim 13, wherein a voltage charged in the first sub-pixel electrode is larger than a voltage charged in the second sub-pixel electrode.]

[15. The liquid crystal display apparatus of claim 1, wherein the plurality of thin film transistors are connected to opposite sides of the plurality of data lines alternately every pixel row, and openings of a plurality of pixels associated with the plurality of pixel electrodes have substantially a same shape.]

[16. A liquid crystal display apparatus comprising:

a plurality of data lines each having a plurality of first straight line portions, a plurality of second straight line portions alternately linearly disposed with the first straight line portions, and a plurality of first and second curved portions alternately connected between the first and second straight line portions;

a plurality of pairs of first and second gate lines disposed substantially perpendicular to the plurality of data lines;

a plurality of pairs of first and second thin film transistors connected to the plurality of pairs of first and second gate lines, respectively, and the plurality of data lines; and a plurality of pixel electrodes connected to the plurality of first and second thin film transistors, each of the plurality of pixel electrodes comprising first and second sub-pixel electrodes respectively connected to a pair of first and second thin film transistors of the plurality of pairs of first and second thin film transistors, wherein the first and second thin film transistors comprise first and second drain electrodes connected to the first and second sub-pixel electrodes, respectively, the first and second drain electrodes each comprising a first end portion surrounded by one of the plurality of first and second curved portions, and a second end portion extending from the first end portion in a transverse direction substantially parallel to the first and second gate lines, wherein each of the first and second curved portions comprises:

a substantially concave surface; and a substantially convex surface opposing the substantially concave surface, wherein a terminal of the concave surface and a terminal of the convex surface of each of the first and second curved portions both meet a terminal of one of the first and second straight line portions adjacent to each of the first and second curved portions, and wherein both of the substantially concave surface and the substantially convex surface of at least one of the first curved portion and the second curved portion are disposed on a same side with respect to two extended edges of the first and second straight line portions adjacent to the at least one of the first and second curved portions.]

[17. The liquid crystal display apparatus of claim 16, wherein magnitudes of first and second data voltages applied to the first and second sub-pixel electrodes, respectively, are different from each other and are obtained from single image information.]

[18. The liquid crystal display apparatus of claim 16, wherein the first and second straight line portions of each data line and the respective first and second curved portions are disposed substantially in the same line.]

[19. The liquid crystal display apparatus of claim 18, wherein channels of the first and second thin film transistors are disposed in extension lines of the first and second straight line portions of the data lines.]

[20. The liquid crystal display apparatus of claim 18, wherein the first and second drain electrodes are at least one of located substantially at a same position in respective pixels and are substantially symmetrically disposed in a pixel array matrix.]

[21. The liquid crystal display apparatus of claim 18, wherein the first and second thin film transistors are connected to the data lines of different sides alternately in every pixel row.]

[22. The liquid crystal display apparatus of claim 21, wherein polarities of data voltages of adjacent data lines are opposite to each other.]

[23. The liquid crystal display apparatus of claim 21, wherein polarities of data voltages of one of adjacent data lines to a data line therebetween are the same.]

[24. A liquid crystal display apparatus comprising:

a plurality of pixels arrayed in a matrix and each of the plurality of pixels having pixel electrodes;

a plurality of gate lines connected to the plurality of pixels and each of the plurality of gate lines having a plurality of gate electrodes;

a plurality of data lines disposed substantially perpendicular to the plurality of gate lines and having a plurality of source electrodes; and a plurality of drain electrodes facing respective source electrodes of the plurality of source electrodes and connected to the respective pixel electrodes, wherein each of the plurality of drain electrodes comprises:

a first end portion disposed substantially opposite a respective source electrode of the plurality of source electrodes;

a second end portion extending from the first end portion substantially parallel to the plurality of gate lines the second end portion being directly connected with the first end portion;

a first portion extending from a connection point between the first end portion and the second end portion in a direction substantially parallel to the plurality of data lines, the first portion extending away from both the first end portion and the second end portion, the first portion comprising an end disposed at the connection point between the first end portion and the second end portion; and an enlarged portion connected to another end of the first portion and connected to the respective pixel electrode of the plurality of pixel electrodes.]

[25. The liquid crystal display apparatus of claim 24, wherein the gate lines include dummy gate electrodes having substantially the same shape as the gate electrodes.]

[26. The liquid crystal display apparatus of claim 24, further comprising dummy drain electrodes which are at least one of located substantially at same positions as the drain electrodes and are substantially symmetrically disposed in a pixel array matrix.]

[27. The liquid crystal display apparatus of claim 24, wherein two pixels are disposed between two adjacent data lines.]

[28. The liquid crystal display apparatus of claim 24, wherein the switching devices and the data lines are substantially linearly aligned relative to each other.]

[29. The liquid crystal display apparatus of claim 24, wherein adjacent source electrodes are oriented in different directions with respect to the data lines.]

[30. The liquid crystal display apparatus of claim 24, wherein switching devices having the gate, source, and drain electrodes and residing in adjacent pixels are disposed at different locations within the adjacent pixels with respect to the pixel electrodes of the adjacent pixels, and wherein openings of the plurality of pixels have substantially a same shape.]

*31. A thin film transistor panel comprising:*

*thin film transistors having gate electrodes, source electrodes and drain electrodes, respectively;*

*a gate line connected to the gate electrodes of the thin film transistors;*

*dummy gate electrodes connected to and extended from the gate line in a same direction as the gate electrodes, the dummy gate electrodes having the same shape and size as the gate electrodes, and each dummy gate electrode being disposed between adjacent gate electrodes.*

*32. The thin film transistor panel of claim 31, wherein the gate electrodes are separated from each other by a first pitch, and the dummy gate electrodes are separated from each other by a second pitch which is equal to the first pitch.*

*33. The thin film transistor panel of claim 31, further comprising:*

*pixel electrodes connected to the drain electrodes of the thin film transistors; and*

*dummy drain electrodes connected to the pixel electrodes, the dummy drain electrodes having the same shape with each other.*

*34. The thin film transistor panel of claim 33, further comprising:*

*a protective film disposed between the thin film transistors and the pixel electrode, and having contact holes exposing the dummy drain electrodes, the pixel electrodes being connected to the dummy drain electrodes through the contact holes.*

*35. The thin film transistor panel of claim 33, further comprising a storage electrode line having branches overlapping the pixel electrodes.*

*36. A thin film transistor panel comprising:*

*thin film transistors arranged in a matrix, the thin film transistors having gate electrodes, source electrodes, and drain electrodes;*

*a first gate line connected to the gate electrodes of the thin film transistors disposed in a first row of the matrix;*

*a second gate line connected to the gate electrodes of the thin film transistors disposed in a second row of the matrix;*

*first dummy gate electrodes connected to and extended from the first gate lines in a same direction as the gate electrodes connected to the first gate line, the first dummy gate electrodes having the same shape and size as the gate electrodes connected to the first gate line, and each first dummy gate electrode being disposed between adjacent gate electrodes connected to the first gate line; and*

*second dummy gate electrodes connected to and extended from the second gate lines in a same direction as the gate electrodes connected to the second gate line, the second dummy gate electrodes having the same shape and size as the gate electrodes connected to the second gate line, and each second dummy gate electrode being disposed between adjacent gate electrodes connected to the second gate line.*

*37. The thin film transistor panel of claim 36, wherein the gate electrodes connected to the first gate line are separated from each other by a first pitch, and the first dummy gate electrodes are separated from each other by a second pitch which is equal to the first pitch.*

*38. The thin film transistor panel of claim 37, wherein the gate electrodes connected to the second gate line are separated from each other by the first pitch, and the second dummy gate electrodes are separated from each other by the second pitch.*

*39. The thin film transistor panel of claim 36, further comprising:*

*a first pixel electrode connected to one of the thin film transistors disposed in the first row;*

*a second pixel electrode connected to one of the thin film transistors disposed in the second row, the second pixel electrode being longitudinally adjacent to the first pixel electrode;*

*a first dummy drain electrode connected to the first pixel electrode; and*

*a second dummy drain electrode connected to the second pixel electrode,*

*wherein a location of the first dummy drain electrode with respect to the first pixel electrode is different from a location of the second dummy drain electrode with respect to the second pixel electrode.*

*40. The thin film transistor panel of claim 39, wherein the second dummy drain electrode has the same shape as the first dummy drain electrode.*

*41. The thin film transistor panel of claim 39, further comprising:*

*a protective film disposed between the thin film transistors and the pixel electrodes, and having contact holes exposing the dummy drain electrodes, the pixel electrodes being connected to the dummy drain electrodes through the contact holes.*

*42. The thin film transistor panel of claim 39, further comprising a storage electrode line having branches overlapping the pixel electrodes.*

* * * * *